(12) United States Patent
Batten et al.

(10) Patent No.: US 12,053,718 B1
(45) Date of Patent: *Aug. 6, 2024

(54) LOW COST OIL/GREASE SEPARATOR

(71) Applicant: Thermaco Incorporated, Asheboro, NC (US)

(72) Inventors: William C. Batten, Asheboro, NC (US); Randolph Batten, Asheboro, NC (US); Travis McBride, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,875

(22) Filed: Jun. 25, 2023

Related U.S. Application Data

(60) Division of application No. 17/215,014, filed on Mar. 29, 2021, now Pat. No. 11,786,843, which is a continuation of application No. 14/965,956, filed on Dec. 11, 2015, now Pat. No. 10,960,324.

(60) Provisional application No. 62/112,870, filed on Feb. 6, 2015, provisional application No. 62/090,693, filed on Dec. 11, 2014.

(51) Int. Cl.
*B01D 43/00* (2006.01)
*B01D 17/02* (2006.01)

(52) U.S. Cl.
CPC ...... *B01D 17/0211* (2013.01); *B01D 17/0202* (2013.01)

(58) Field of Classification Search
CPC ............ B01D 17/0211; B01D 17/0202; B01D 17/041; B01D 17/12; E03F 5/16
USPC ....................................................... 210/523, 86
See application file for complete search history.

(56) References Cited

U.S. PATENT DOCUMENTS

| | | | |
|---|---|---|---|
| 530,684 A | 12/1894 | Gibbons | |
| 773,362 A | 10/1904 | Anderson | |
| 3,358,838 A * | 12/1967 | Kosar | B01D 17/0202 210/776 |
| 3,365,060 A | 1/1968 | Hsu | |
| 3,426,902 A | 2/1969 | Kilpert et al. | |
| 4,208,291 A * | 6/1980 | Ochoa | B01D 21/02 210/522 |
| 4,235,726 A | 11/1980 | Shimko | |

(Continued)

FOREIGN PATENT DOCUMENTS

| | | |
|---|---|---|
| DE | 3215896 | 11/1983 |
| GB | 10958 | 4/1915 |

(Continued)

*Primary Examiner* — Akash K Varma
(74) *Attorney, Agent, or Firm* — MacCord Mason PLLC

(57) ABSTRACT

A container for receiving and holding effluent water containing oil/grease to be removed including a sealed enclosure. In one example, a cover supports a partially immersed rotatable disk; a drive on the main sectional cover rotates the disk; a trough on the main sectional cover straddles the disk; and a blade on the trough scrapes a side of the disk, to direct oil and grease from the disk along the scraper blade along the trough for collection in a storage container. Efficiencies of construction of the sectional covers, disk and a sensor probe are disclosed in some examples. Also disclosed are apparatus, system and methods for a sealed container for receiving and holding effluent water containing oil/grease to be removed.

18 Claims, 40 Drawing Sheets

(56) References Cited

U.S. PATENT DOCUMENTS

| | | | |
|---|---|---|---|
| 4,268,396 A | | 5/1981 | Lowe |
| 4,651,762 A | | 3/1987 | Bowden |
| 4,681,680 A | | 7/1987 | Delons et al. |
| 5,133,881 A | * | 7/1992 | Miller ................ B01D 17/0214 |
| | | | 210/776 |
| 5,167,815 A | | 12/1992 | Bachmann et al. |
| 5,344,566 A | | 9/1994 | Clancey |
| 5,360,555 A | | 11/1994 | Batten |
| 5,522,990 A | | 6/1996 | Davidian |
| 5,722,508 A | * | 3/1998 | Kraus .................... F01M 11/04 |
| | | | 141/98 |
| 6,800,195 B1 | * | 10/2004 | Batten ................ B01D 17/0214 |
| | | | 210/138 |
| 2002/0003104 A1 | | 1/2002 | Evanovich et al. |
| 2006/0054550 A1 | * | 3/2006 | Batten ................ B01D 17/0214 |
| | | | 210/523 |
| 2008/0179262 A1 | * | 7/2008 | Batten .................... B01D 17/02 |
| | | | 210/776 |

FOREIGN PATENT DOCUMENTS

| | | |
|---|---|---|
| JP | 48-30826 | 9/1973 |
| JP | 60-120022 | 6/1985 |
| NL | 8502049 | 7/1985 |
| SU | 1269809 | 10/1983 |

\* cited by examiner

LOW COST OIL/GREASE SEPARATOR

This application is a divisional of U.S. application Ser. No. 17/215,014 filed Mar. 29, 2021, which is a continuation of U.S. application Ser. No. 14/965,956 filed Dec. 11, 2015, which claims the benefit of U.S. Provisional Application No. 62/112,870, filed Feb. 6, 2015 and U.S. Provisional Application No. 62/090,693, filed Dec. 11, 2014, all of which are incorporated herein by reference.

BACKGROUND

This invention relates to a low cost assembly for the removal and recovery of oil, grease and solid wastes found in drains or effluent discharge of restaurants, food processing, or like facilities, industrial plants, maintenance facilities, or other circumstances involving mixtures of oil, grease and solid waste material to be recovered or removed. This application has some subject matter similar to the disclosure of U.S. patent application Ser. No. 10/161,814, filed Jun. 4, 2002, the entire disclosure of which is hereby incorporated by reference.

Oil, grease and solid waste contaminant removal or recovery systems are well known in the prior art. Over the past thirty years there has been a steady move towards requiring food handling facilities to have systems for servicing kitchen grease and solid waste bearing water flows. Sewer system lines can become clogged from the fats, oil and grease waste materials (hereinafter referred to collectively as "oil/grease") put into the sewer system from food handling facilities. This has led more and more sewer authorities to implement fats, oils and grease control programs. These programs regulate food handling facilities and the manner in which they process oil, grease and solid waste material. The object of many of these programs is to ensure that food handling facilities remove as much of the oil and grease as possible from the effluent flow, thereby releasing only grey water to the sewer system.

One method recognized in the prior art of accomplishing such removal is the use of a container including one or more rotating disks formed of a plastic or like applicable material to which oil/grease contaminants are attracted. Typically, the rotation of the disk is in an at least partially immersed condition, which allows the oil to cling to one or both sides of the disk so that contaminants are removed from the body of water upon rotation of the disk. Scrapers are typically used to force the oil contaminants from the opposite sides of the disk and channel such contaminants to a collection or disposal storage unit.

U.S. Pat. No. 5,133,881 to Miller et al. is representative of such oil and grease removal systems containing one or more rotating disks. The Miller et al. patent discloses an oil/grease removal assembly which removes such contaminants from the surface of the body of water and includes a rotatable disk made of plastic or other material to which such oil contaminants have an affinity so they adhere to the disk. The disk is disposed in cooperative relation to an elongated trough having scraper blades for engaging the opposite sides of the disk for the removal of the oil contaminants therefrom with the trough disposed and structured to direct such oil contaminants away from the disk and the body of water via the trough to a storage container. The disclosure of this patent, issued to B. Glenn Miller and William C. Batten and assigned to Thermaco, Inc. in Asheboro, North Carolina, is hereby incorporated herein by reference.

Applicant realized that the existing devices may be difficult to service and are very often permanently installed at facility sites. Because many of the parts are coated with oil/grease, servicing can be messy and time consuming. Since these systems are typically permanently installed and tend to be expensive and represent a significant capital investment it is not desirable for the device to regularly, and noticeably, emit foul odors. Accordingly, there is a need in the art for an apparatus for separation of oil/grease and solid waste from wastewater which is simple in design, low in cost and controls the escape of odors that can be associated with grease removal systems.

SUMMARY OF THE INVENTION

The inventions of the present disclosure fulfills one or more of these needs in the art by providing a modular oil/grease removal assembly including a container for receiving and holding effluent water containing oil/grease to be removed from the effluent water and having sectional covers. A main sectional cover supports a rotatable disk in a partially immersed position within the body of effluent water and in contact with the oil/grease. A drive is mounted on the main sectional cover in driving engagement to provide rotation of the disk when the drive is engaged. A trough is mounted on the main sectional cover in engaging relation to opposite sides of the rotatable disk, and a scraper blade is mounted on the trough so that the scraper blade extends from the trough into sliding engagement with a side of the disk. The disk, scraper blade and trough are cooperatively disposed and structured to direct oil and grease from the disk along the scraper blade along the trough for collection in a storage container.

In one embodiment the main sectional cover supports an electrical resistance heater that extends downwardly into the container so as to have an operable portion of the heater at least partially immersed within the body of effluent water to cause the oil/grease to be in liquid form. The main sectional cover may also support electrical controls for selectively operating the drive and the heater. A first shield preferably covers the rotating disk, trough and scraper blade, and a second shield covers the electrical controls. The first shield may be provided with vent holes to permit the escape of vapors so as to reduce vapor condensation within the first shield. The first shield may have a hinged portion covering at least portions of the rotating disk, trough and scraper blade, so that the hinged portion can be opened for access to clean and/or service the rotating disk, trough and scraper blade.

In one embodiment, a unitary shield covers the rotating disk, trough scraper blade, and the electrical controls. If a single shield is used, preferably, the shield has a partition to separate the rotating disk and trough scraper blade from the electrical controls. The shield may include front and rear sections meeting to form a barrel for a hinge for covers for the rotating disk, trough scraper blade and electrical controls.

The electrical control may include a timer connected to the drive to control the start and stop operation of the drive to permit a selected duty cycle to remove grease at times when grease is likely to be present, and the second shield may have a hinged portion covering a control for the timer, permitting access to the timer without removal of the entire second shield.

The main sectional cover typically has two pair of opposite sides with one pair of opposite sides adapted to engage the container for support of the main sectional cover by the container and the other pair of opposite sides adapted to engage additional sectional covers. The sides adapted to engage additional sections preferably have a flange extending downwardly and laterally so as to be positioned under a portion of an additional section, with a further downward extension to provide rigidity. The additional sectional cover is typically substantially rectangular with two opposite sides adapted to engage the container for support of the additional sectional cover by the container and one of the two other opposite sides adapted to engage and seal to the main section. The container, in some embodiments, has an inwardly turned upper flange, a gasket on the flange, and clasps to hold the sectional covers to the flange and seal the covers to the flange by compression of the gasket.

The additional sectional cover may have four sides with three sides adapted to engage the container for support of the additional sectional cover by the container and the fourth side has an upper protrusion that has a lower surface with a gasket so the upper protrusion engages and seals to an upper surface of the flange of the main sectional cover that extends downwardly and laterally and a downward ear that engages the further downward extension of the main section.

Alternatively, the protrusion may be downward. In another alternative, a pseudo hinge allows optional joining of sections.

The container may have an inlet end, an outlet end and left and right sides, looking in the direction from the inlet to the outlet ends, and the sectional covers may have first and second mounting edges so that they can be mounted to the container with a first mounting edge on the left and a second mounting edge on the right or the second mounting edge on the left and the first mounting edge on the right.

In one embodiment there are two or more main sectional covers and one or more additional sectional covers between the main sectional covers having opposite sides to engage the main sections. The opposite sides of the additional sectional cover each having upper and lower protrusions spaced by a spacer of dimension so the upper protrusion engages an upper surface of the flange of the main sectional cover that extends downwardly and laterally and the lower protrusion engages the further downward extension. The upper protrusion may have a lower surface with a gasket to seal with the flange of the main sectional cover that extends downwardly and laterally.

The apparatus may include at least one additional sectional cover to the main sectional cover, with the sectional covers configured to provide a hinged but severable relationship between the sectional covers in some examples, and providing a complete cover to seal the container across the top. The trough may be mounted below the main sectional cover in engaging relation to the opposite sides of the rotatable disk. The scraper blade may be mounted to the trough so that the scraper blade is also below the main sectional cover. The scraper blade may remove the grease from the disk and into the trough. There may be a trough extension to accept the grease from the trough and dispose of the grease through the grease outlet. The grease outlet may be located in a side or end of the container, set apart from the container cover and/or below the container cover. The drive, electronics and a portion of the scraper blade may be above the container cover and may be enclosed by an enclosure. The enclosure may have a top that attaches to the enclosure to create a sealed enclosure. The sealed enclosure may be continuous with an internal sealed space within the container to create a sealed assembly. There may be a sealed communication between the grease outlet of the container and a storage tank for the separated grease.

In one embodiment, the additional sectional cover has four sides with three sides adapted to engage the container for support of the additional sectional cover by the container. The fourth side has a lower protrusion and a gasket so the lower protrusion of the additional section abuts the further downward extension of the main sectional cover and the gasket engages and seals to the main sectional cover.

In one embodiment the disk includes two disk sheets separately formed and subsequently joined together. The two sheets preferably are identical and each include a flat oleophilic surface and a surface having a plurality of spaced peripheral lugs. The lugs of each sheet are preferably odd in number so that upon turning the oleophilic surfaces away from one another and joining the two sheets, the lugs of the opposing sheets may be interleaved to form a periphery for the disk with gaps between the lugs. The sheets may be joined by means selected from the group consisting of screwing, bolting, ultrasonic welding, vibration welding, other welding and adhering. The sheets may have bosses on the same side as the lugs and the sheets are joined at the bosses. The sheets are preferably injection molded plastic. A suitable plastic is polypropylene. The drive may be a sprocket with flattened teeth to engage the lugs. The sheets preferably have central hole with a surrounding rim to form a bearing for an axle extending through the central hole.

The assembly may include a sensor module mounted to the main sectional cover. The sensor module includes a probe extending downwardly within the body of effluent water to a depth normally below the oil/grease. A sensor in the probe provides electrical indications as to whether the sensor is in proximity to oil/grease or water. An alarm on the sensor module to provide a human-recognizable indication if the sensor senses that the probe is in proximity to oil/grease rather than the normally-present water. The sensor and alarm are typically electrical and are powered by a low voltage power supply to the sensor module separate from power to the drive that rotates the disk. An electrical alarm output from the sensor module may be provided to enable electrical connection to a remote monitoring apparatus to signal alarm conditions to the remote monitoring apparatus, such as a SCADA monitoring apparatus. The probe is preferably a watertight cylindrical shaft, and the sensor is positioned at a distal end of the cylindrical shaft and held in place at the distal end by a spacer. The sensor module may also include a ready light indicating proper operation.

In one embodiment the container has an inlet end and a solids removal module positioned at the inlet end. The solids removal module may be a strainer. Alternatively, the solids removal module may include a hopper having an eductor at a lower portion of the hopper, a water inlet to the eductor to make a jet of water to remove contents of the hopper in proximity to the eductor and an outlet from the eductor to an outlet of the container. The hopper preferably includes a lower portion laterally offset from the eductor, so that excess solids do not block jet action of the eductor.

The invention may also be considered as a method of assembly of a modular oil/grease removal assembly including installing a container for receiving and holding effluent water containing oil/grease to be removed from the effluent water and having sectional covers; mounting a main sectional cover supporting a rotatable disk for partial immersion within effluent water in the container and in contact with the oil/grease, a drive in driving engagement to provide rotation of the disk when the drive is engaged; a trough mounted on the main sectional cover in engaging relation to opposite sides of the rotatable disk; a scraper blade mounted on the trough so that the scraper blade extends from the trough into sliding engagement with a side of the disk. The disk, scraper blade and trough are cooperatively disposed and structured to direct oil and grease from the disk along the scraper blade along the trough for collection in a storage container. An electrical resistance heater may be included that extends downwardly into the container so as to have an operable portion of the heater at least partially immersed within the body of effluent water to cause the oil/grease to be in liquid form. Electrical controls for selectively operating the drive and the heater may also be on the main sectional cover. The method includes mounting additional sectional covers to cover the container, and installing a first shield to cover the rotating disk, trough and scraper blade and a second shield to cover the electrical controls.

The method may also be considered as including installing a container for receiving and holding effluent water containing oil/grease to be removed from the effluent water and having sectional covers. The method includes mounting a main sectional cover that has two pair of opposite sides with one pair of opposite sides adapted to engage the container for support of the main sectional cover by the container and the other pair of opposite sides having flanges extending downwardly and laterally with a further extension downwardly to provide rigidity and that supports a rotatable disk for partial immersion within effluent water in the container and in contact with the oil/grease, a drive in driving engagement to provide rotation of the disk when the drive is engaged, a trough mounted on the main sectional cover in engaging relation to opposite sides of the rotatable disk, a scraper blade mounted on the trough so that the scraper blade extends from the trough into sliding engagement with a side of the disk. The disk, scraper blade and trough are cooperatively disposed and structured to direct oil and grease from the disk along the scraper blade along the trough for collection in a storage container. An electrical resistance heater extends downwardly into the container so as to have an operable portion of the heater at least partially immersed position within the body of effluent water to cause the oil/grease to be in liquid form. Electrical controls for selectively operate the drive and the heater. The method may include mounting additional sectional covers that have four sides with two opposite sides engaging the container for support of the additional sectional cover by the container and one of two opposite sides engaging the main sectional cover.

When the container has an inwardly turned upper flange, and a gasket on the flange, this method of assembly may include engaging clasps to hold the sectional covers to the flange and seal the covers to the flange by compression of the gasket.

The method may include installing two or more main sectional covers and one or more additional sectional covers between the main sections, the opposite sides of the additional sectional cover each having upper and lower protrusions spaced by a spacer by engaging the upper protrusion on an upper surface of the flange of the main sectional cover that extends downwardly and laterally and engaging the lower protrusion with the further downward extension. If the upper protrusion has a lower surface with a gasket the method may include sealing the upper protrusion with the flange of the main sectional cover that extends laterally and downwardly.

If the additional sectional cover has four sides with three sides adapted to engage the container for support of the additional sectional cover by the container and the fourth side has an upper or lower protrusion that has a lower surface with a gasket so the upper protrusion, the method may include engaging and sealing the upper protrusion to an upper surface of the flange of the main sectional cover that extends downwardly and laterally and engaging a downward ear of the additional sectional cover with the further downward extension of the main sectional cover.

The invention may also be considered as a method of assembly of a modular oil/grease removal assembly for receiving and holding effluent water containing oil/grease to be removed from the effluent water including: identifying an inlet source of effluent water and a downstream drain for grey water, installing a container having an inlet, an outlet and left and right sides looking in the direction from the inlet to the outlet ends, installing a main sectional cover that supports the functional apparatus to remove oil/grease from water and discharges oil/grease to one of the left and right sides of the container so that the discharge of oil/grease is convenient for servicing, and mounting additional sectional covers to completely cover the container. Such a method may also include refraining from mounting the main sectional cover from a structurally feasible mounting that would have the discharge of oil/grease be inconvenient for servicing.

The invention also may be considered as a method of making a disk for a modular oil/grease removal assembly including forming two disk sheets separately and subsequently joining the two disk sheets together to form a disk. Preferably, the two sheets are made identical and each includes a flat oleophilic surface and a surface having a plurality of spaced peripheral lugs. Especially when the lugs of each sheet are odd in number, the method includes turning the oleophilic surfaces away from one another, interleaving the lugs of the opposing sheets, and joining the two sheets to form a periphery for the disk with gaps between the lugs. The sheets may be joined by means selected from the group consisting of screwing, bolting, ultrasonic welding, vibration welding, other welding and adhering. If the sheets have bosses on the same side as the lugs, the method preferably includes joining the sheets at the bosses. Forming the sheets is preferably by injection molding plastic, particularly polypropylene. Forming preferably includes forming the sheets with a central hole with a surrounding rim to form a bearing and passing an axle through the central hole.

The method may also include mounting a sensor module to the main sectional cover including a probe extending downwardly within the body of effluent water to a depth normally below the oil/grease. A sensor in the probe provides electrical indications as to whether the sensor is in proximity to oil/grease or water, and an alarm on the sensor module provides a human-recognizable indication if the sensor senses that the probe is in proximity to oil/grease rather than the normally-present water. Such a method preferably includes connecting a low voltage power supply to the sensor module separate from the power to the functional apparatus to remove oil/grease from water. It may also include connecting an electrical alarm output from the sensor module to a remote monitoring apparatus to signal alarm conditions to the remote monitoring apparatus, such as a SCADA monitoring apparatus.

The method may also include positioning a solids removal module at the inlet end. The solids removal module may be a strainer. As an alternative, the solids removal module may be a hopper having an eductor at a lower portion of the hopper, and the method includes including connecting a water inlet to the eductor to be available to make a jet of water to remove contents of the hopper in proximity to the eductor and connecting an outlet from the eductor to an outlet of the container.

The invention also may be considered as a method of modifying a modular oil/grease removal assembly including removing one or more of the sectional covers, removing an installed solids removal strainer, and installing a hopper having an eductor at a lower portion of the hopper, and including connecting a water inlet to the eductor to be available to make a jet of water to remove contents of the hopper in proximity to the eductor and connecting an outlet from the eductor to an outlet of the container.

Also disclose is a sealed modular oil/grease removal assembly including a container for receiving and holding effluent water containing oil/grease to be removed from the effluent water, a cover supporting a rotatable disk in a partially immersed position within the body of effluent water and in contact with the oil/grease, a drive mounted on the cover in driving engagement to provide rotation of the disk when the drive is engaged, and a unit enclosure contributing to a sealed environment within the assembly, wherein the unit enclosure includes a sealed skimming enclosure and a sealed control enclosure. The sealed modular oil/grease removal assembly may include a skimmer module.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

The invention will be better understood by a reading of the Detailed Description of the Preferred Embodiments along with a review of the drawings, in which.

DETAILED DESCRIPTION OF THE PREFERRED EMBODIMENTS

Figure 1:
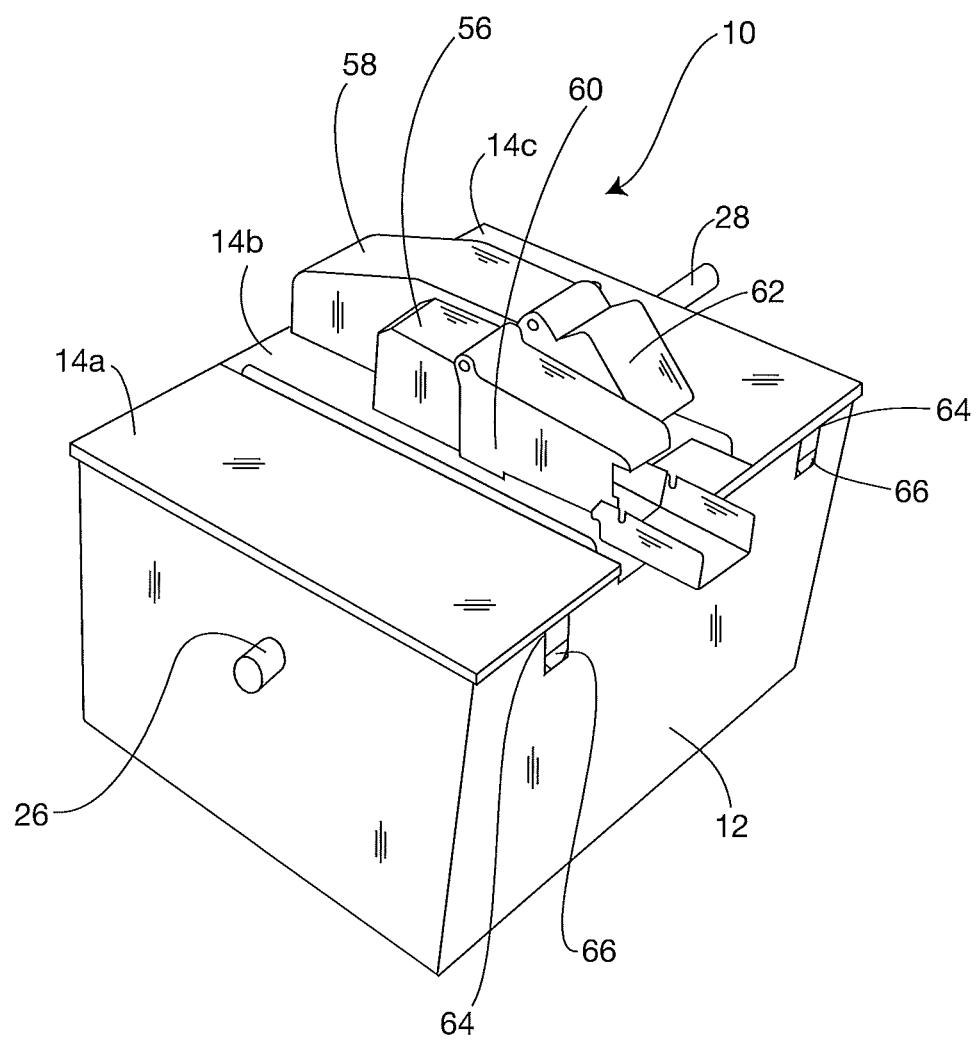
FIG. 1 is a perspective view of an embodiment of the invention.

In the following description, like reference characters designate like or corresponding parts throughout the several figures. It should be understood that the illustrations are for the purpose of describing preferred embodiments of the invention and are not intended to limit the invention thereto.

Figure 2:
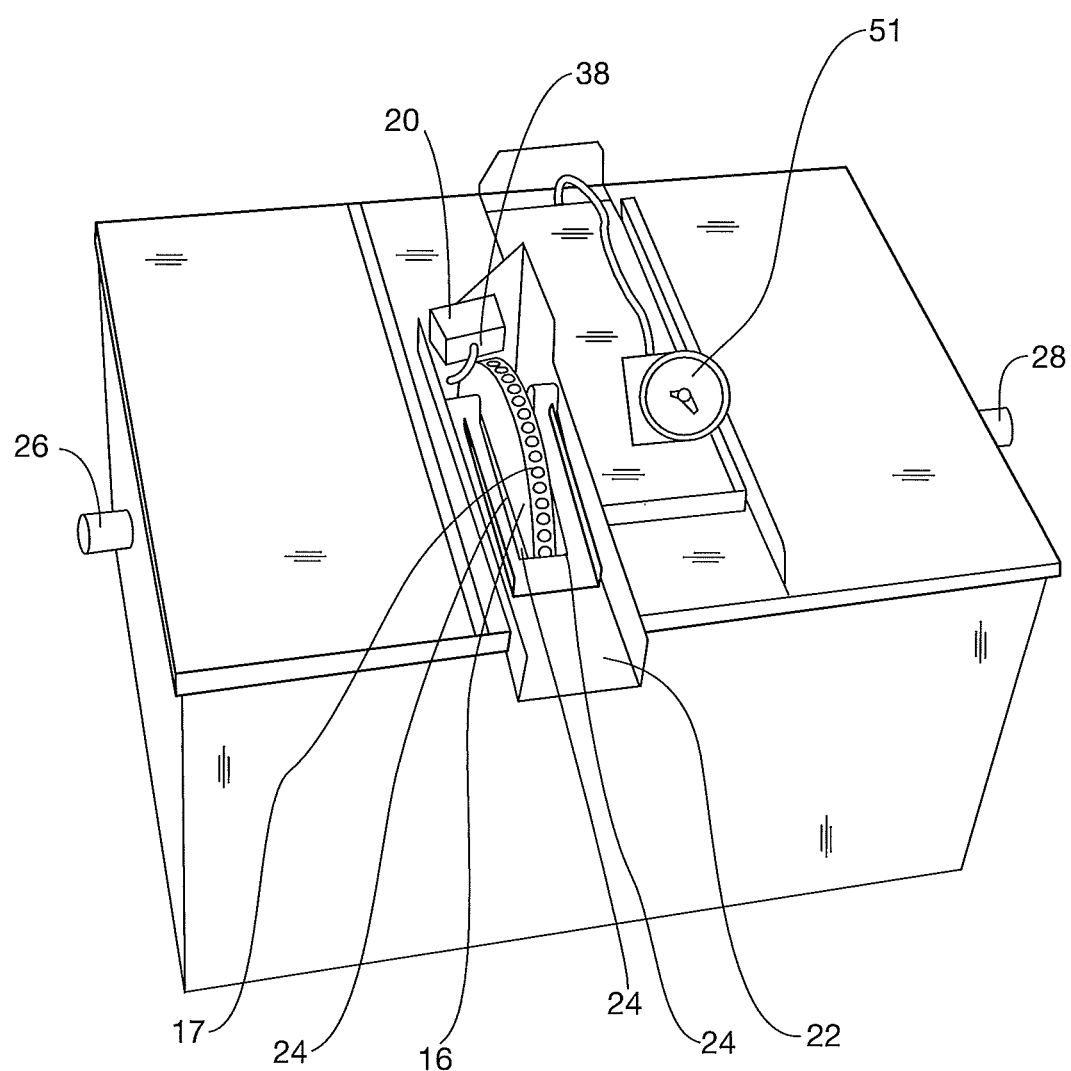
FIG. 2 is a perspective view of the container with the shields removed.
Figure 3:
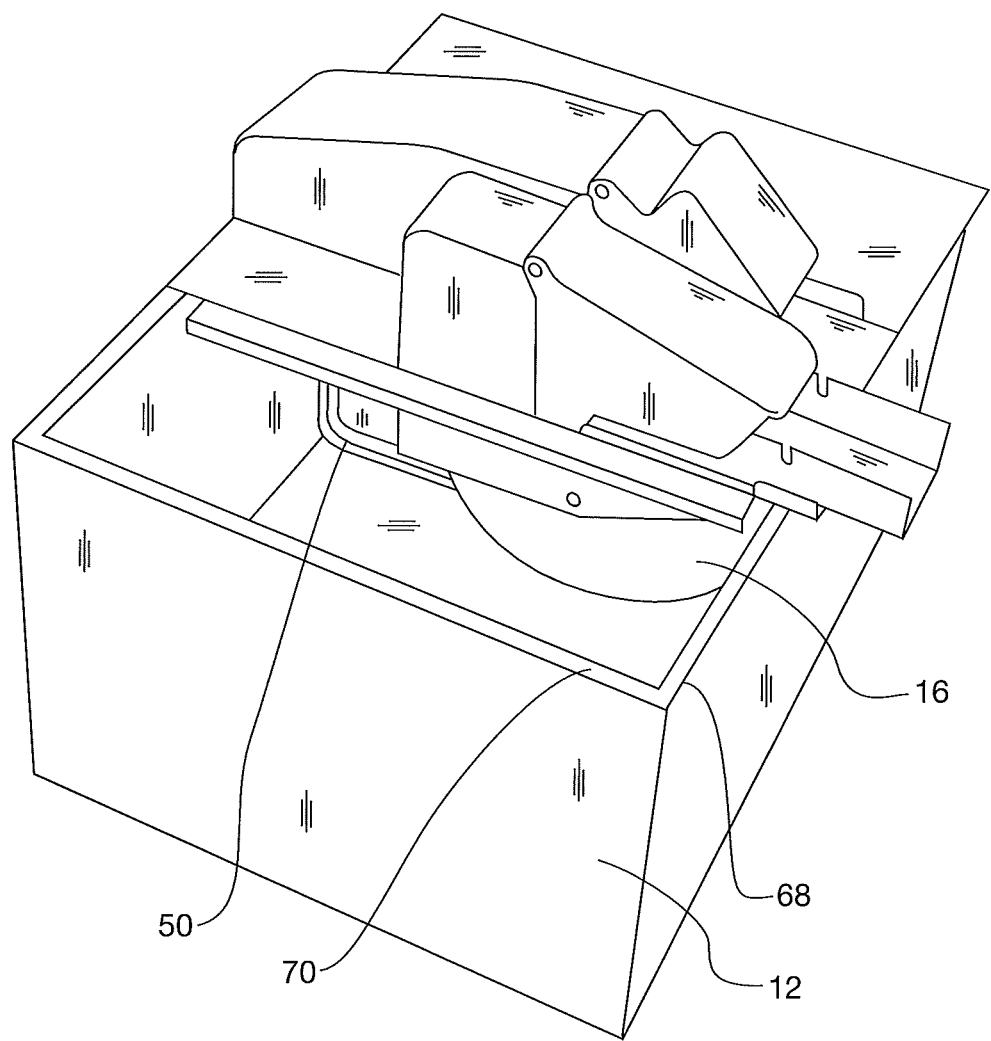
FIG. 3 is a perspective view of the container with one of the additional cover sections removed.

Referring now to the Figures in general, and FIGS. 1-3, the oil, grease and solid removal assembly 10 includes a container 12 with sectional covers 14a, 14b, and 14c. In a preferred embodiment as seen in FIG. 1, the sectional covers are separate plates, preferably stainless steel. The assembly 10 has at least one rotatable disk 16 (shown in FIG. 2) supported by the center sectional cover 14b. FIG. 2 also depicts the gear drive motor 20 and the trough 22 which are attached to the center sectional cover 14b. The container 12 also includes an inlet pipe 26 and an outlet pipe 28. The effluent water with waste materials enters through the inlet pipe 26, and after oil, grease and solid waste have been removed, the grey water exits out of the outlet pipe 28. As seen in FIG. 2, the trough 22 has scraper blades 24. The gear drive motor 20 supports and rotates the drive sprocket 38 which is cooperatively meshed with peripheral holes in the disk 16.

Figure 5:
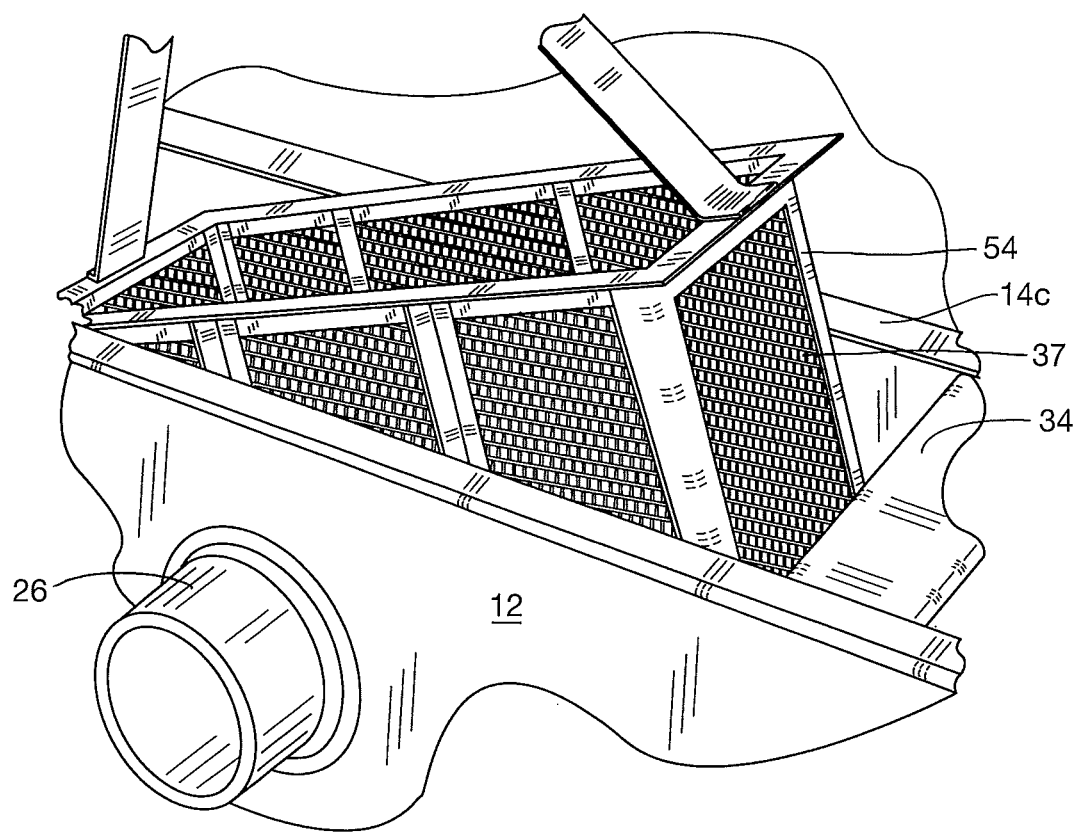
FIG. 5 is a perspective view of the strainer basket being put in place.

The basket support 34 is depicted in FIG. 5. The basket support 34 is constructed of rotomolded plastic and is designed to hold a strainer basket 54. The basket support 34 is immediately downstream of the inlet pipe 26 and has a cutout to align with the inlet pipe 26. Basket support openings 37 permits the effluent water with oil and grease to flow downstream of the basket support 34 after the solid waste material has been trapped in the strainer basket 54.

Referring to FIG. 1, the sectional covers 14a, 14b and 14c cover each of the sections of the oil, grease and solid waste removal assembly. In the preferred embodiment, a leading sectional cover 14a provides easy access to the strainer basket 54 within the basket support 34 and a downward stream sectional cover 14c is atop the outlet baffle (not shown) leading effluent from a low portion of the container 12 to the outlet 28.

Figure 4:
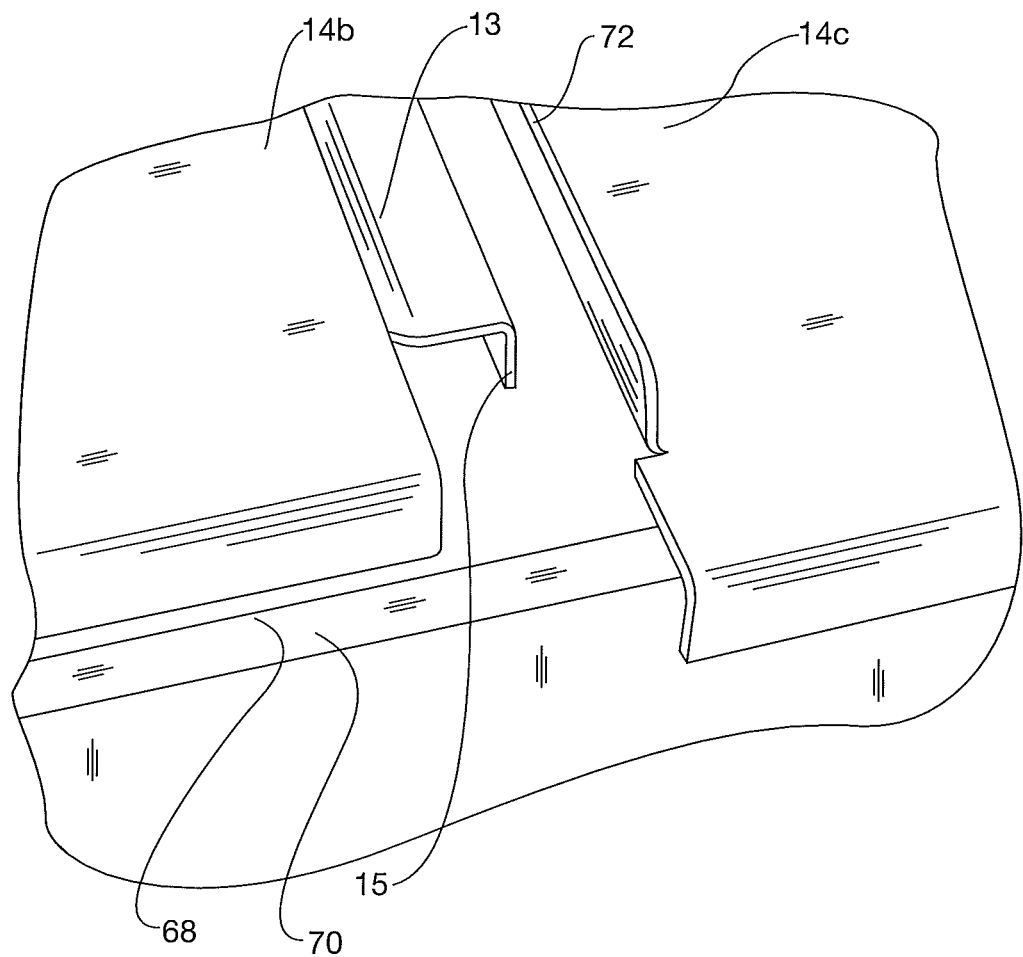
FIG. 4 is an enlarged perspective view of the mating of an additional sectional cover with the main sectional cover.

The center sectional cover 14b is depicted in FIGS. 3 and 4. The center sectional cover 14b is constructed of stainless steel and includes a flange 13 extending downwardly and laterally and a further extension 15, seen in FIG. 4. The rotatable disk 16 is constructed of oleophilic plastic or is at least covered with an oleophilic material. In one embodiment, the disk 16 has equally spaced indentations 17 on its outer circumferential edge. The sprocket 38 meshes with the holes 17 in the disk 16. The disk 16 is rotated clockwise in the view of FIG. 2 when the gear drive motor 20 rotates counter-clockwise.

As best seen in FIG. 2 the center sectional cover 14b supports the trough 22, which is constructed of stainless steel. The trough 22 further includes elongated scraper blades 24 which are constructed of a flexible plastic or rubber material. As seen in FIG. 3, the center sectional cover 14b also supports the heating element 50 which is utilized to maintain a sufficiently warm water temperature to melt any grease contained in the grey water, permitting it to flow to and be removed by the rotating disk 16. The heating element 50 seen in FIG. 2 is a 300 watt heater with a quick reaction thermostat and is designed to run continuously. The timer 51 is connected to the gear drive motor 20 and controls the start and stop operation of the gear drive motor 16 and ultimately the rotation of the disk 16. It permits a selected duty cycle to remove grease at times when grease is likely to be present.

In one embodiment, the oil, grease and solid removal assembly 10 is connected to drain from a sink or other device that discharges effluent water with waste materials to be separated. The water containing waste materials flows from the device's drain into the oil, grease and solid removal assembly 10 through the inlet pipe 26. The effluent water flows into the basket support 34 containing a strainer basket 54 and the solid waste materials are trapped and removed from the effluent water. The effluent water containing oil and grease flows downstream from the basket support 34 through openings 37 into the center section. The center section cover 14b supports the oil and grease removal assembly. In the volume of the container 12 between the basket support 34 and the outlet baffle 46, the effluent has time to reside, permitting oil and grease to rise to the top of the water. The grease is maintained in a liquid state by the heater 50. When the gear drive motor 20 turns the drive sprocket 38, the disk 16 is rotated in a clockwise direction by the counter clockwise rotation of the drive sprocket 38. The disk 16 is positioned in the center cover 14b, so that its lower portion is below the surface of the effluent water having the oil and grease which has floated to the surface. As the disk 16 rotates through the water, oil and grease are picked up on the sides of the disk 16. As the disk 16 rotates, the scraper blades 24 which are attached to the trough 22 remove the oil and grease from the sides of the disk 16. The oil and grease flows down the trough 22 to an oil and grease storage container (not shown). Once the oil and grease have been removed from the effluent water, the grey water flows downstream under the baffle outlet and exits the oil, grease and solid removal assembly 10 through the outlet pipe 28 into the sewage system.

The oil, grease and solid removal assembly 10 is easy to maintain. The center section cover 14b containing the gear drive motor 20, the drive sprocket 38, the disk 16, the trough 22 and the scraper blades 24 is a single, low cost unit. If there is a malfunction in any of the components of this unit, it is more cost effective to replace the entire unit than to repair the malfunctioning component. By stocking an extra unit at the facility site, virtually no down time in operation of the low cost oil, grease and solid removal assembly 10 would be experienced. In addition, because the center section cover 14 contains all of the oil and grease removal components, there is a greater flexibility in the installation process. The sectional cover 14b can be installed to have the trough 22 facing in opposite directions by placing the sectional cover one way or the opposite way, depending on the needs of the installation. The sectional covers 14a and 14c are preferably identical and either can be positioned over the strainer basket or the outlet baffle, depending on the selected orientation.

The container 12 of the low-cost oil, grease and solid removal assembly 10 is constructed of a rotomolded plastic or welded stainless sheets. The container 12 is constructed with an inlet pipe 26 and the outlet pipe 28. The sectional covers 14 can then be installed, although they may well be removed and reinstalled at the jobsite.

Referring again to FIG. 1, the center sectional cover 14b is provided with a first shield 56 and a second shield 58. The shields are molded plastic and are held in place over the trough component and electrical components, respectively. By using separate shields over the two operating components of the center sectional cover 14b, humidity that is generated through the openings around the rotating disk is segregated from the electrical components shielded under the separate shield 58. The two shields 56 an 58 are each provided with hinged components. A hinged component 60 lifts up to expose the rotating disk and trough, so that debris clogging the trough and scraper blades can be removed. The hinged cover 62 of the second shield 58 provides access to the timer 51 so that adjustments can be made to the timer setting.

Figure 10:
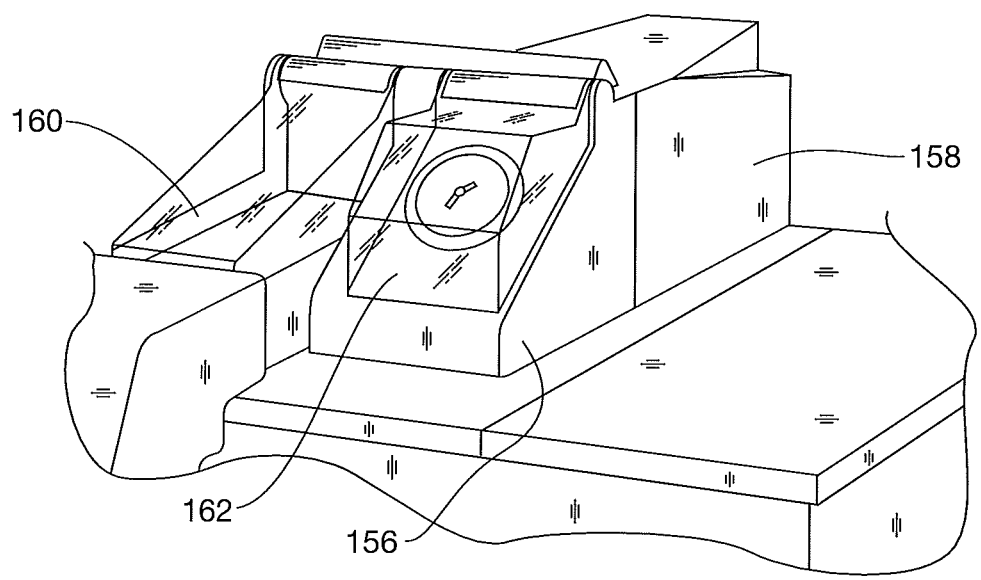
FIG. 10 is a front perspective view of an alternate shield.
Figure 11:
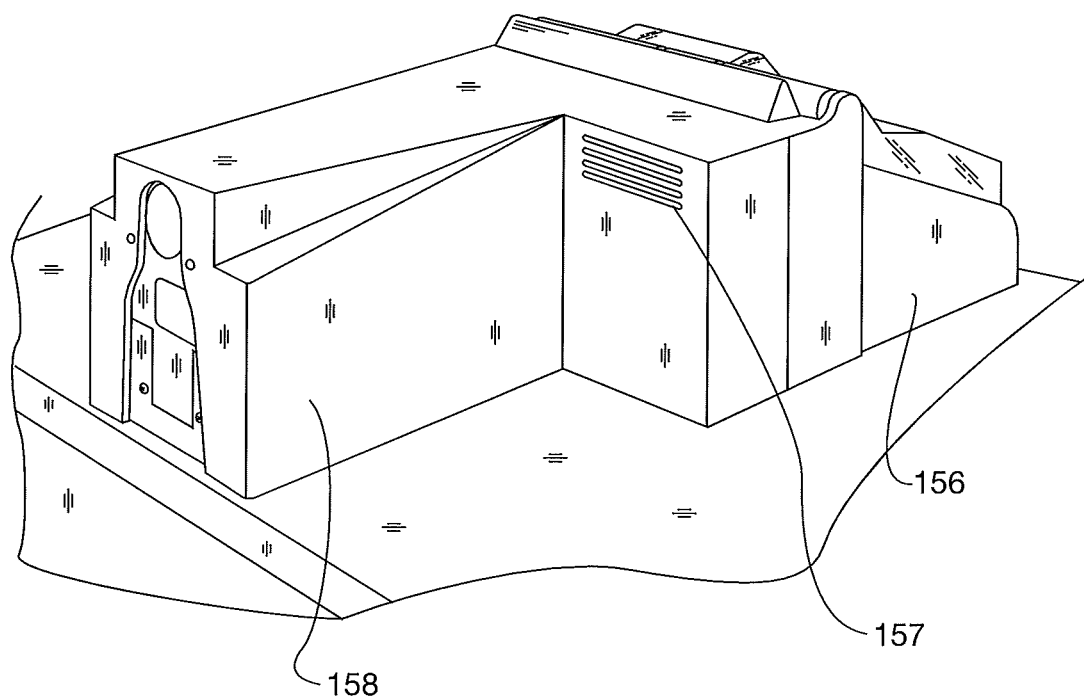
FIG. 11 is a rear perspective view of the shield of FIG. 10.
Figure 12:
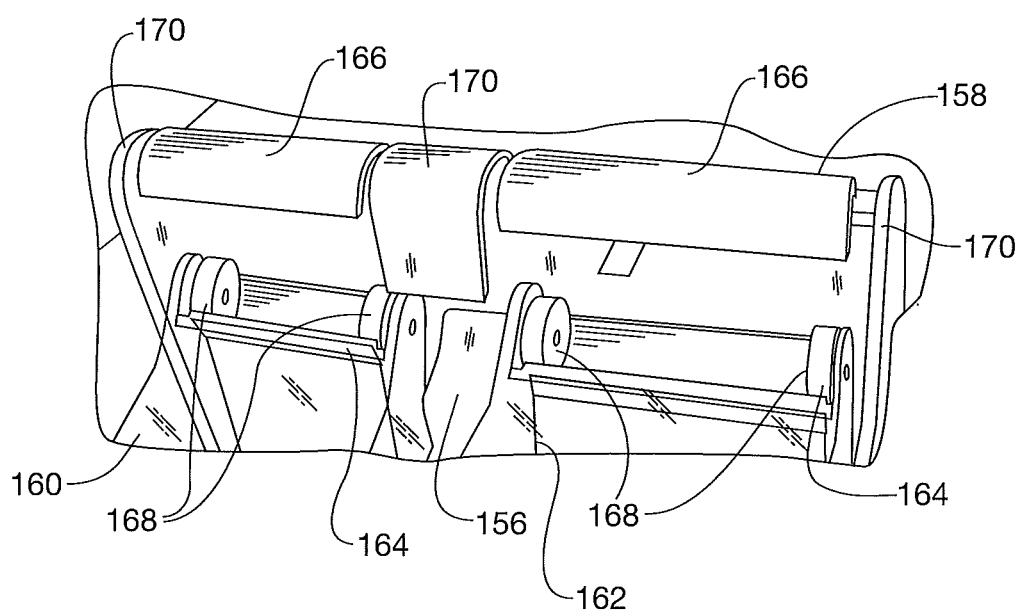
FIG. 12 is an enlarged view of a portion of the shield of FIG. 10, partially disassembled.

FIGS. 10-12 show an alternate shield embodiment. This embodiment still has two shields, but these are a front shield 156 and a rear shield 158. A hinged component 160 lifts up to expose the rotating disk and trough, so that debris clogging the trough and scraper blades can be removed. The hinged cover 162 provides access to the timer 51 so that adjustments can be made to the timer setting. Each of the shields 156, 159 has internal partitions that separate the volume under the shield into left and right portions to keep humidity away from the electronics, as above. Preferably, the portion of the shield covering the disk has vents 157 to let humidity escape. The arrangement to join the front and rear shields and simultaneously make a hinge barrel for the hinging covers 160 and 162 is seen in FIG. 12. The front shield has upwardly open half-cylinders 164, and the rear shield has downwardly open half-cylinders 166. The half-cylinders are sized and shaped to form nearly complete cylinders when the rear shield and front shield are adjoined. Interposed between the half cylinders are short cylindrical bosses 168 formed on ears of the covers 160 and 162. Edge guards 170 also help restrain the bosses to only rotary motion within the nearly complete cylinders.

As seen in FIG. 1, the top sectional covers have edge mounted hooks 64. Clasp components 66 are positioned on the container 12, so that loops on the clasps can hold the hooks 64 down in compressive relation to the container 12. As seen in FIG. 3, the container 12 has an inwardly turned upward flange 68 around the peripheral, capped by a gasket material 70 so that as the sectional covers 14a, 14b, 14c are held onto the container, a seal is formed to prevent the egress of vapors from the container 12. The mounting of additional sectional covers is shown in FIG. 4. The main sectional cover 14b is provided with a downwardly and laterally extending flange 13 with a downward extension 15. This downward extension provides longitudinal rigidity to the sectional cover 14b.

As seen in FIG. 4, the additional cover 14c is provided with an upwardly turned flange 72. Once the main sectional cover 14b is in place, the additional sectional cover 14c can be mounted with the flange 72 overlying the downwardly and laterally extending flange 13. A gasket on the underside of the edge of the additional sectional cover 14c forms a seal with the top of the laterally and downwardly extending flange 13. These seals need not be perfect.

Figure 4A:
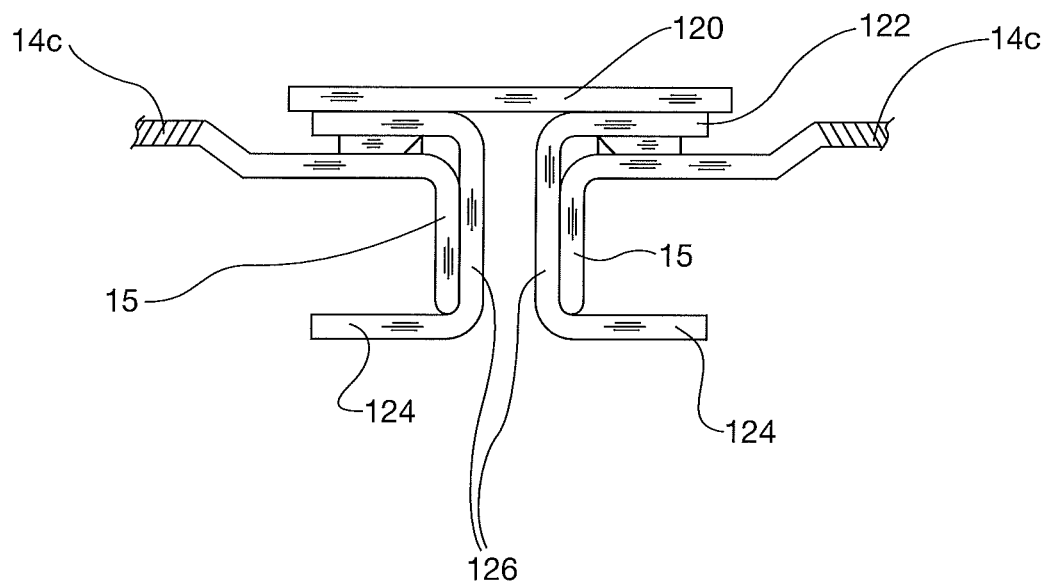
FIG. 4A is a sectional view of two main sectional covers mated with a further additional sectional cover.

As seen in FIG. 4A, for larger volume installations, a larger container 12 can be used and multiple operative main sectional covers 14b can be put in place with an intermediate additional cover 120, having opposite sides adapted to engage the main sectional covers 14c. The opposite sides of the additional sectional cover 120 each have upper 122 and lower 124 protrusions spaced by a spacer 126 of a dimension, so that the upper protrusion 122 engages the upper surface of the flange 13 of the main sectional cover that extends downwardly and laterally, and the lower protrusion 124 engages the further downward extension 15 of the main sectional cover.

Figure 4B:
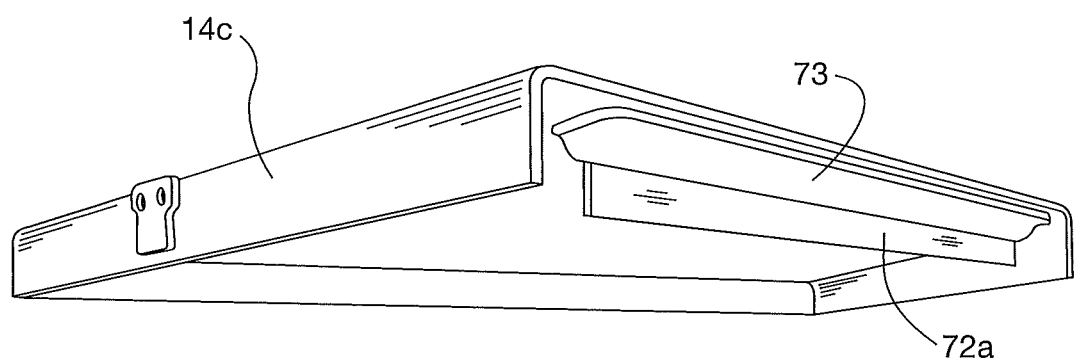
FIG. 4B is a view of an alternate embodiment of the additional sectional cover with a downward protrusion.

FIG. 4B shows an alternate embodiment of the additional cover 14c in which a downward protrusion or flange 72a is provided to abet the downward extension 15 of the main sectional cover. A gasket 73 provides the seal, which again need not be perfect.

Figure 4C:
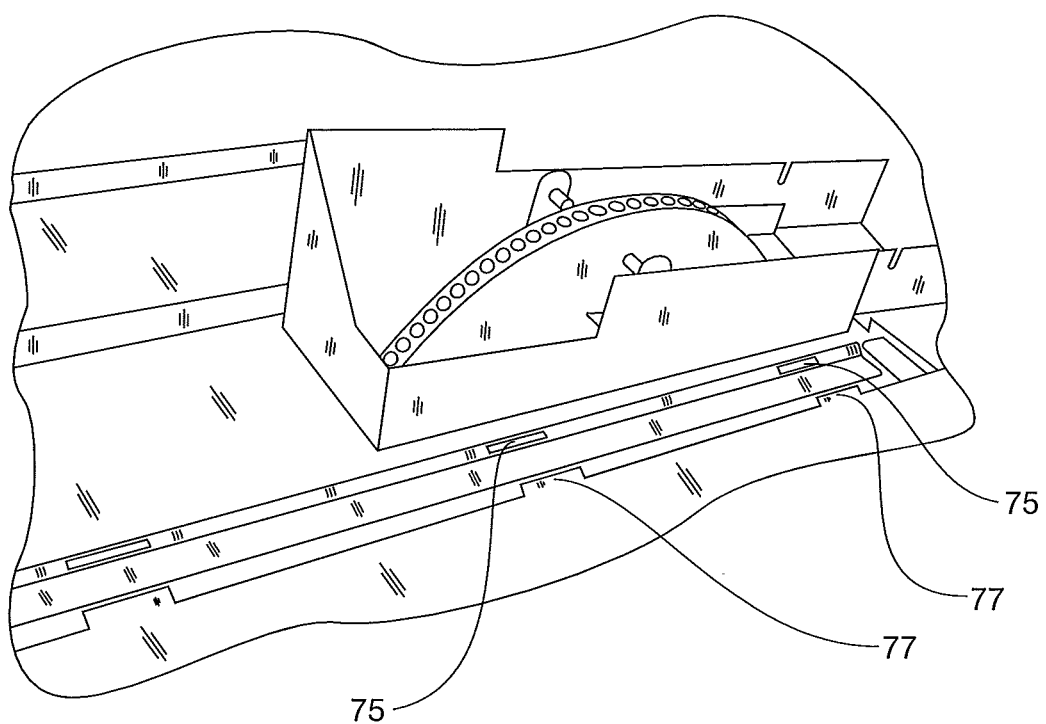
FIG. 4C is a perspective view of another embodiment for abutting the covers.

FIG. 4C shows another alternative. In this embodiment, one of the sectional covers (the main sectional cover in this example) has slots 75. Tabs 77 on the additional section are sized to fit into the slots to provide a hinged but severable relationship between the sections. The tabs and slots may be put on alternate ones of the sectional covers.

Figure 6:
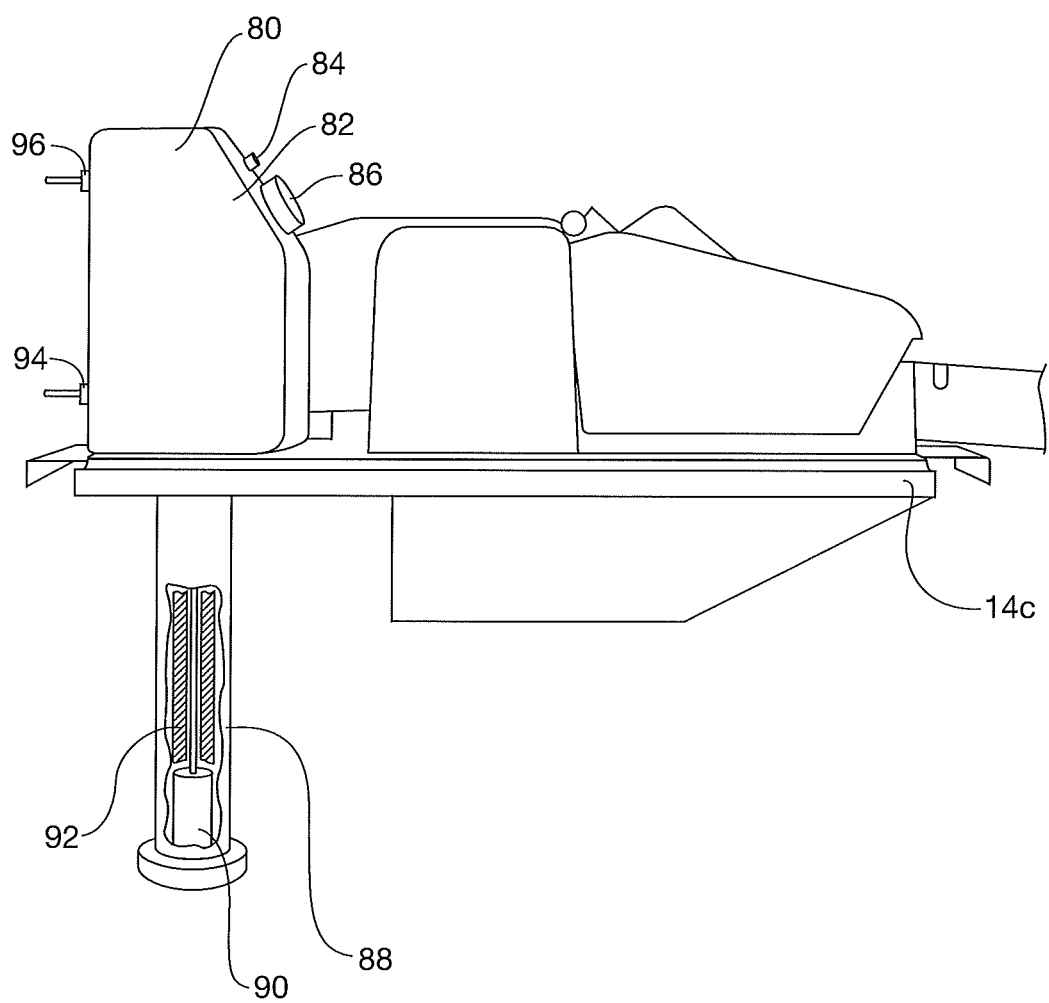
FIG. 6 is a side view of the main sectional cover with the sensor probe in place, partly broken away.

Referring now to FIG. 6, a sensor module 80 is shown mounted to the main sectional cover 14c. The sensor module 80 includes a probe 88 extending downwardly within the body of effluent water to a depth normally below the oil/grease. A sensor 90 within the probe provides electrical indications as to whether the sensor is in proximity to oil/grease or water. Since the sensor 90 that is at a depth that normally is immersed in water, if the oil/grease mat floating on the water becomes unduely thick, because of a malfunction of the unit, the sensor 90 will detect the change in the material in the proximity of the sensor. An alarm 86 on the sensor module provides a human recognizable indication if the sensor senses that the probe is in proximity to oil/grease rather than normally present water. The alarm 86 can be audible or a light, or other suitable alarm indicator. A suitable sensor as is a capacitive sensor such as a K-1 Series Sensor available from IFM Electronic gmbH of Essen, Germany. The sensor 90 is held at the distal end of the probe 88 by a spacer 92 such as a block of foam material. The electrical circuit within the sensor module 80 is powered by a low voltage source 94. It is desirable that the electrical power source be separate from the power to the main separator unit, so that if the source of a malfunction is a failure of power to the entire assembly, it is less likely that the sensor probe will lose power. A remote monitoring output 96 can also be included in the sensor module and it is particularly desired to be of the type that provides connections to SCADA monitoring apparatuses. SCADA systems are well known facilities monitoring systems. A light 84 is provided on the sensor module 80 to show that it is operating.

Figure 7:
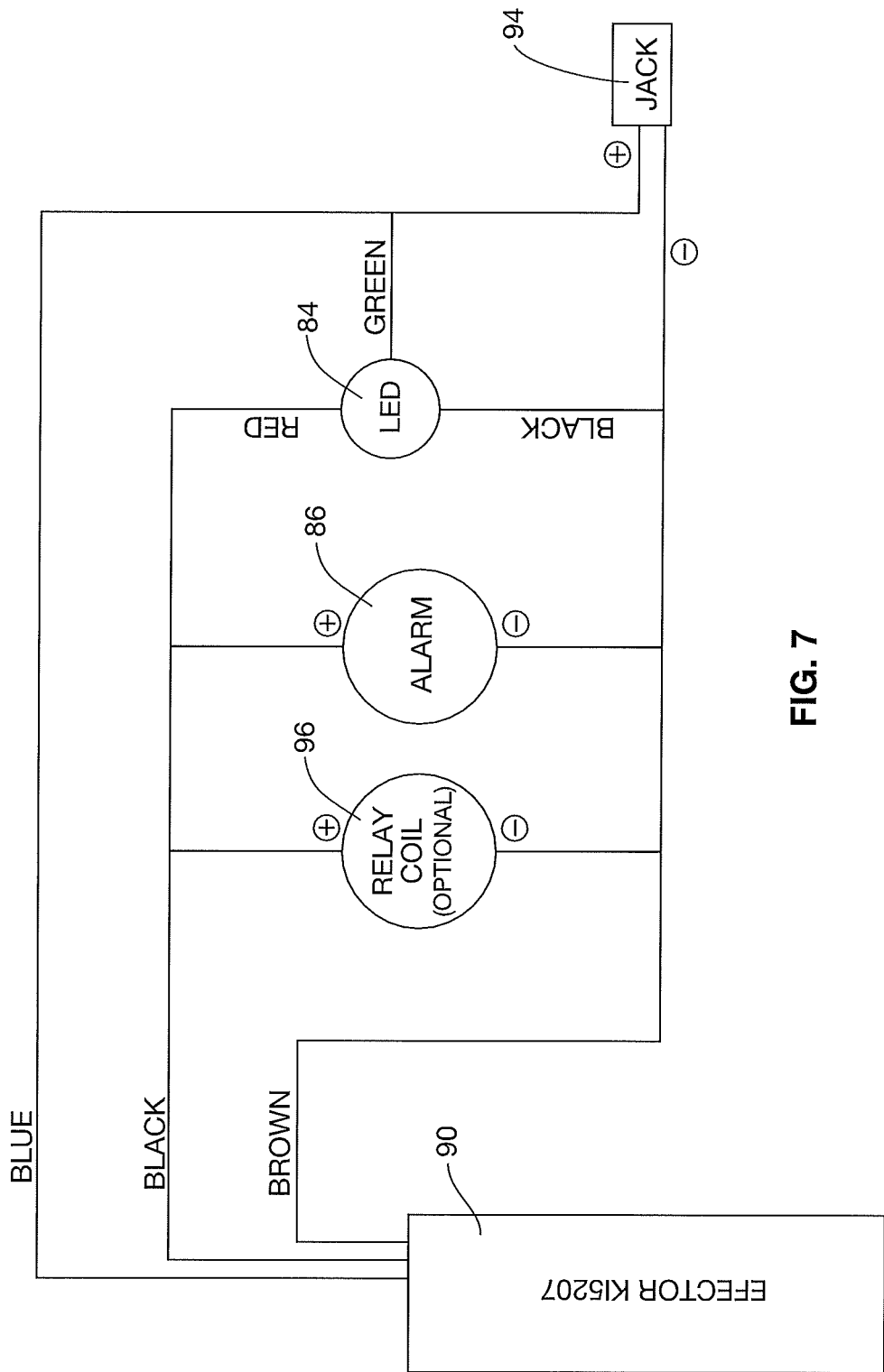
FIG. 7 is a schematic side view of the sensor probe circuit.

The electrical circuit of one example of the sensor module is shown in FIG. 7.

Figure 8:
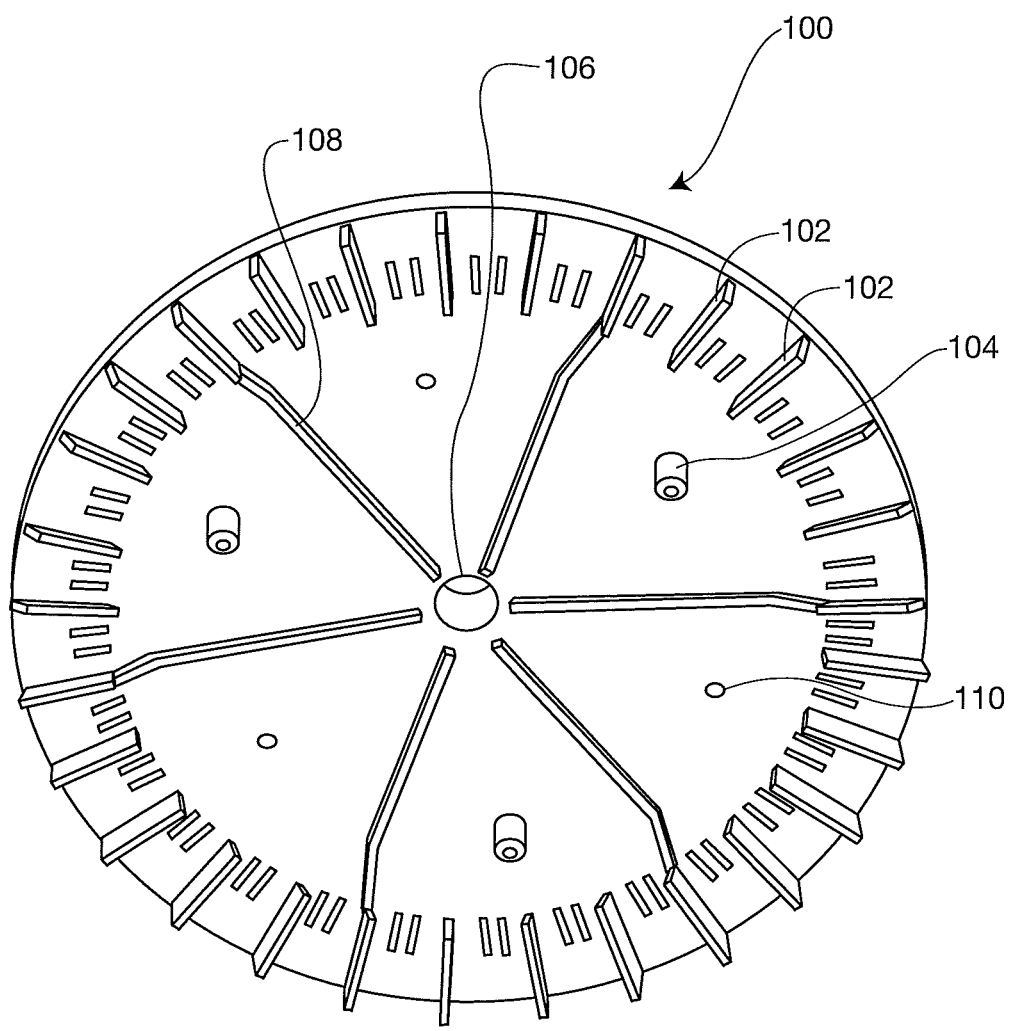
FIG. 8 is a perspective view of one half of an embodiment of the disk.
Figure 9:
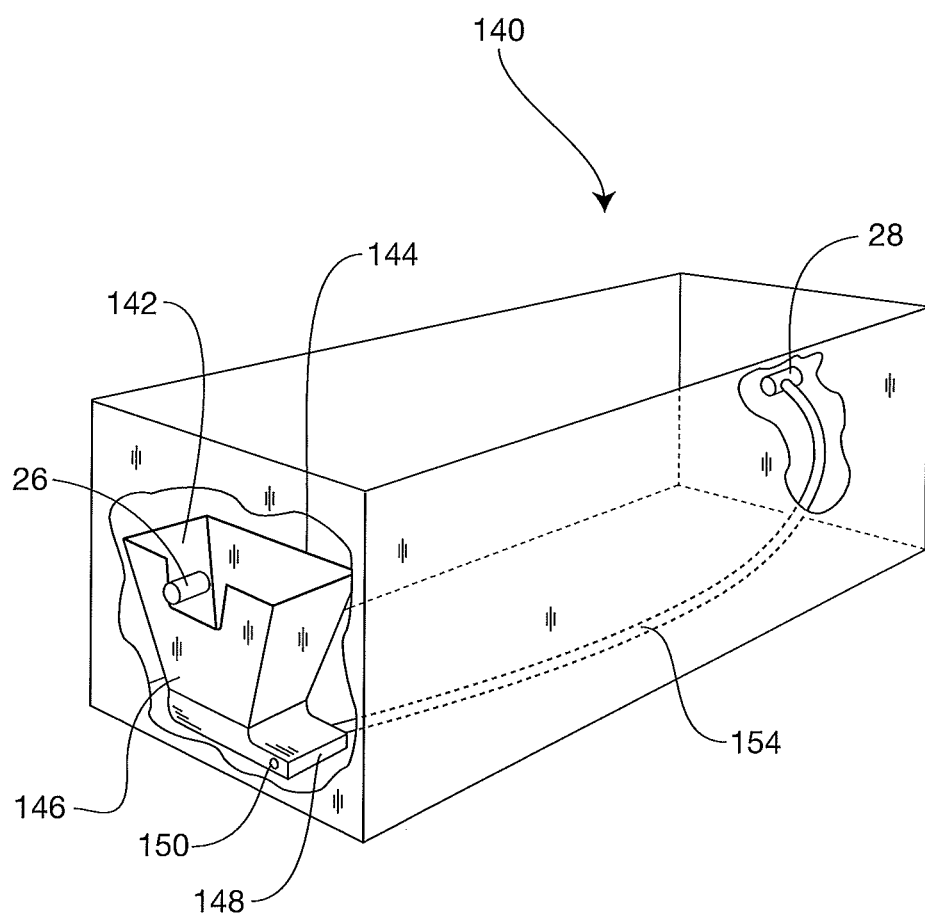
FIG. 9 is a perspective schematic view of a hopper and eductor useful in connection with certain embodiments.

A further improvement in the apparatus can be an improved form of the disk 16, partially seen in respect to FIG. 8. FIG. 8 shows a disk sheet 100 having spaced peripheral lugs 102 and radially inwardly positioned bosses 104. A central hole is formed in this sheet and has a surrounding rim 106. Radially extending outward from the rim 106 are a plurality of ribs 108. The lugs 102 are preferably formed in an odd number of themselves and are equally spaced around the periphery of the disk sheet 100. Two of the sheets 100 are made identically and joined to make a complete disk. The side not shown in FIG. 8 is flat and is provided with an oleophilic property. This property can be made by making the entire sheet 100 out of injection-molded plastic, preferably polypropylene. By taking the two sheets and putting them together lug side-to-lug side rotated by a suitable amount, an equally spaced even number of peripheral teeth are provided in the combined disk. The bosses 104 are provided equally spaced and permit alignment with holes 110 so that screws can be passed through the holes 110 into the aligned bosses 104 from both sides, forming a combined disk. The ribs 108 provide additional rigidity to the disk, and during the molding process ribs 108 permit the plastic to flow in the mold. The peripheral rim 106 provides a central bearing through which an axle may be passed, so that the disk can rotate smoothly on the axle. Providing the disk in this fashion provides a lower manufacturing cost than making a solid disk and machining peripheral holes. In one embodiment, 29 lugs are provided on each disk sheet, so that the combined sheets form a disk with 58 peripheral lugs. The two sheets can also be joined by ultrasonic or vibration welding, passing screws, rather than bolts into the bosses, or any other suitable method. With this embodiment, the lugs form generally axially oriented flat surfaces which engage the sprocket. Therefore it is desirable to have square teeth on the drive sprocket to engage the lugs as the drive motor drives the disk, to make solid contact.

In a further embodiment, the strainer basket can be replaced with an eductor assembly 140. A hopper 142 is positioned in place of a strainer basket and having a suitable overflow 144 for the grey water to exit the hopper 142. The hopper 142 has a converging downward configuration terminating in a narrowed portion 146 offset laterally from an eductor 148 near the inlet end of the container. The eductor is offset laterally from the bottom of the hopper, preferably, so that as solids collect at the narrowed portion at the bottom of the hopper, they do not obstruct the eductor and inhibit its initiation of a jet. An inlet 150 to the eductor is provided with a water supply such as a municipal water supply (not shown). The water pressure from a narrowed inlet to an eductor outlet forms a venturi jet effect to draw the solids from the bottom 146 of the hopper through jet actuation. A tube 154 leads from the eductor to the outlet 28, passing the solids downstream. Preferably the apparatus is made so that it can be equipped either with the strainer assembly or the eductor assembly. The eductor assembly can be retrofitted to an installed system by removing the strainer and installing the hopper 142 with installed eductor 148, connecting a water supply and connecting the tube 154 to the outlet 28. Eductors are known in this art as shown in U.S. Pat. No. 6,491,830 and have proven to be very effective in removing solids upstream of the oil/grease removal disk assembly. The entire disclosure of that patent is hereby incorporated herein by reference.

Figure 13:
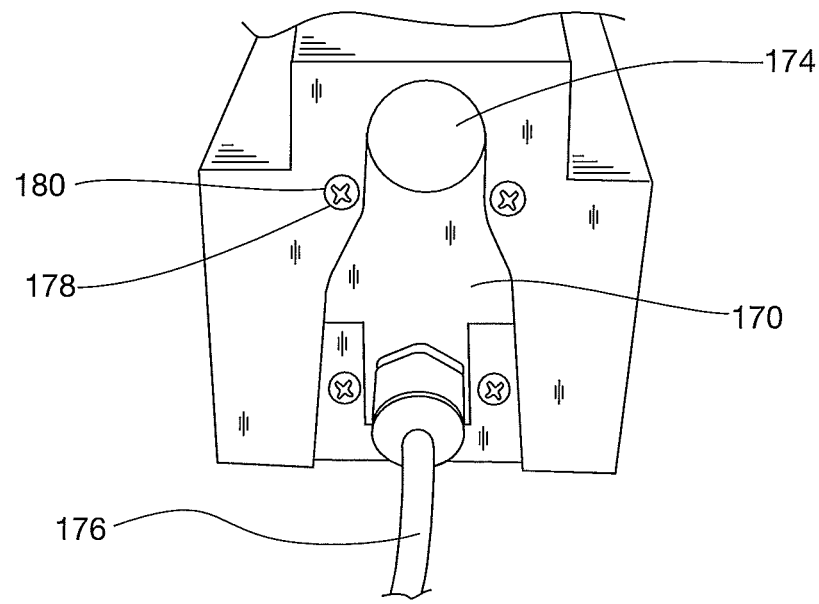
FIGS. 13 and 14 are similar perspective views of an alternate wiring arrangement for the apparatus.
Figure 14:
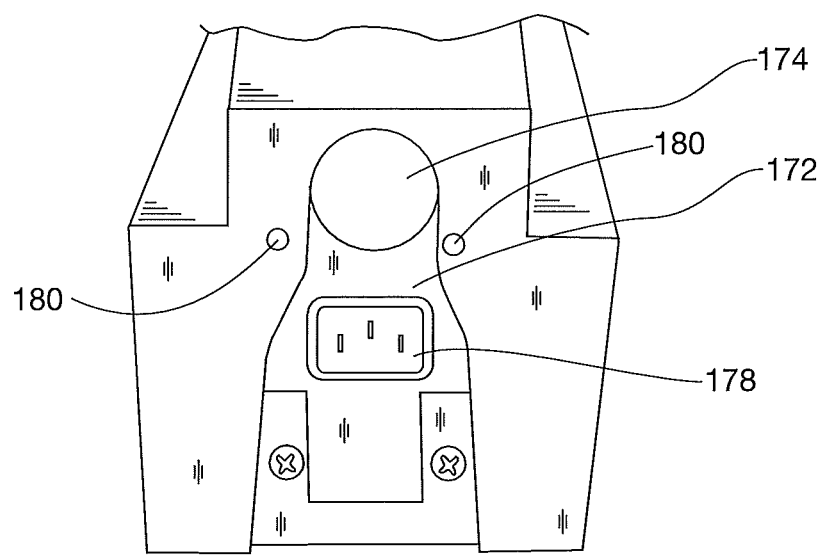
Figure 15:
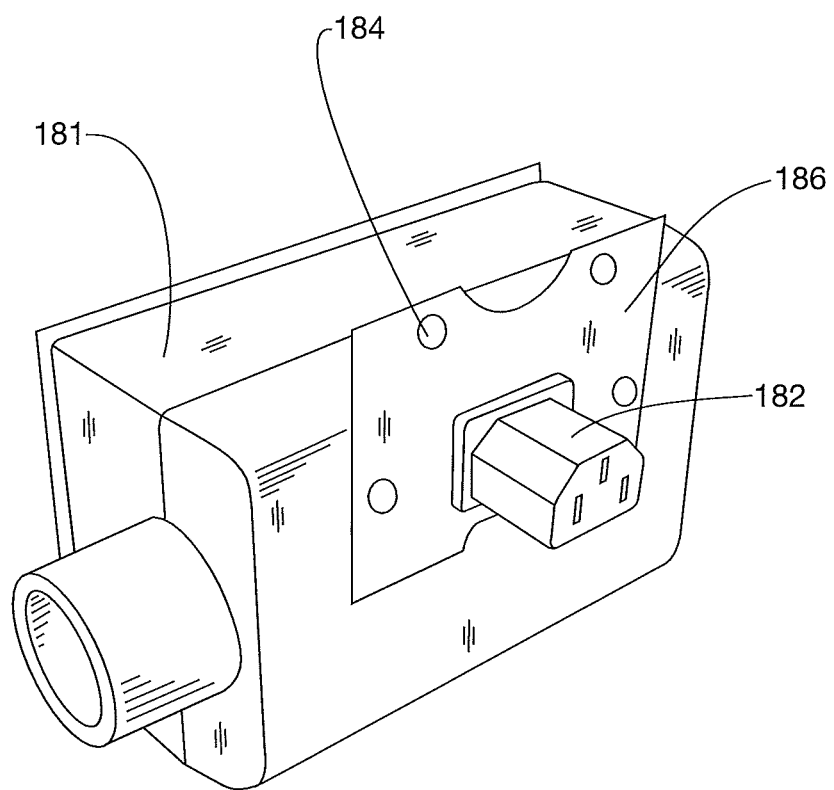
FIG. 15 is a perspective view of a modified junction box usable with the apparatus for FIG. 14.
Figure 16A:
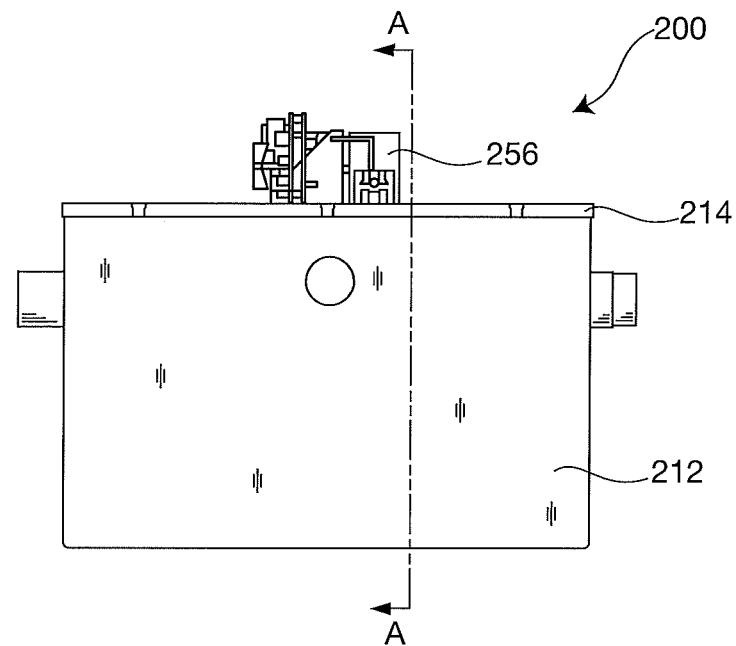
FIGS. 16A-D are front, back and side views of a sealed embodiment of one example of an assembly.
Figure 16B:
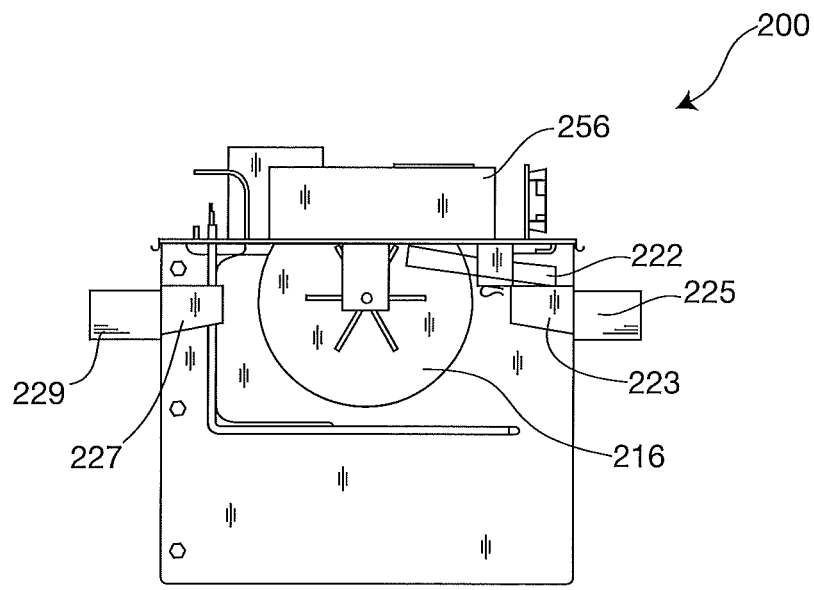
Figure 16C:
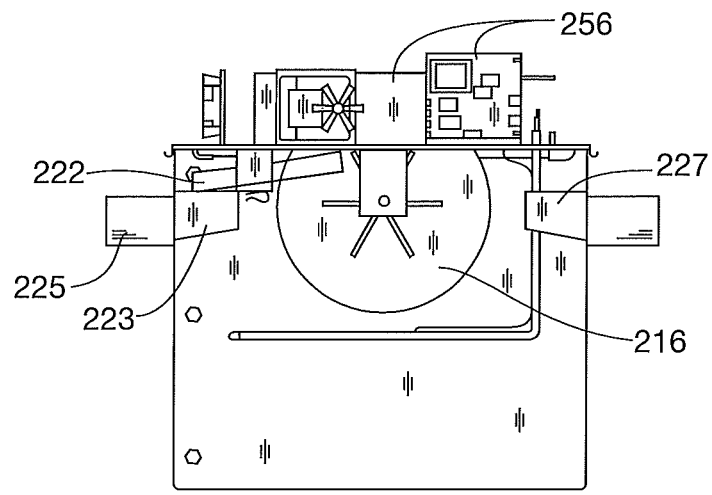
Figure 16D:
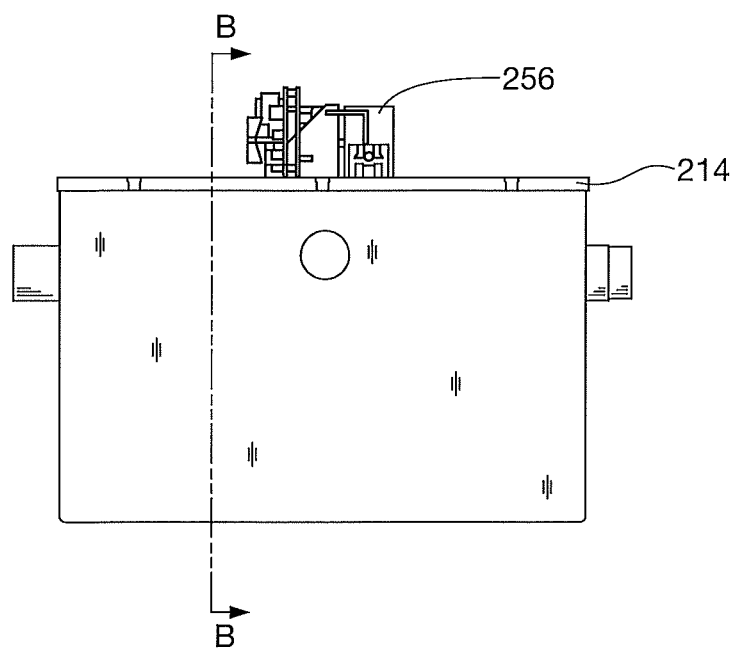
Figure 17A:
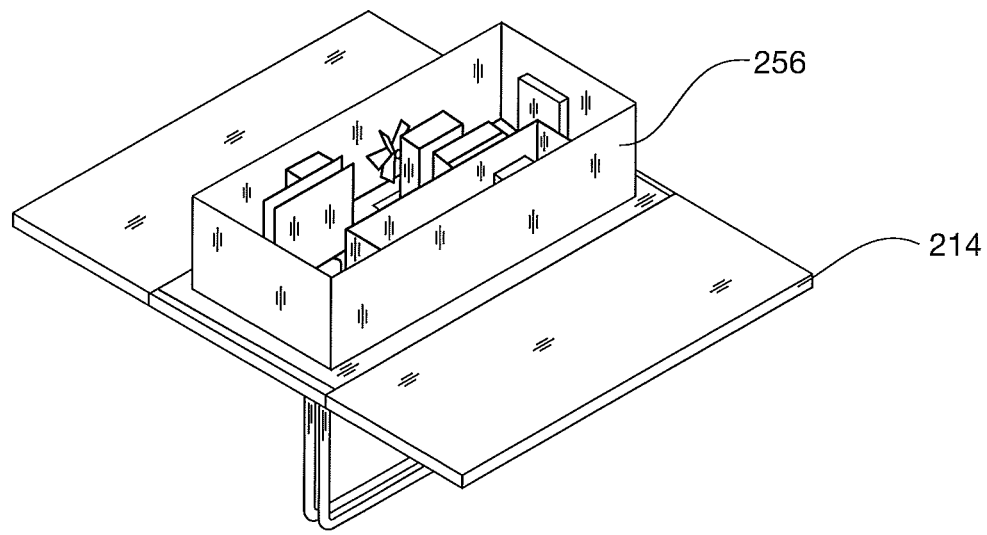
FIG. 17A-E are perspective views of one example of a sealed skimmer enclosure according to the assembly of FIG. 16.
Figure 17B:
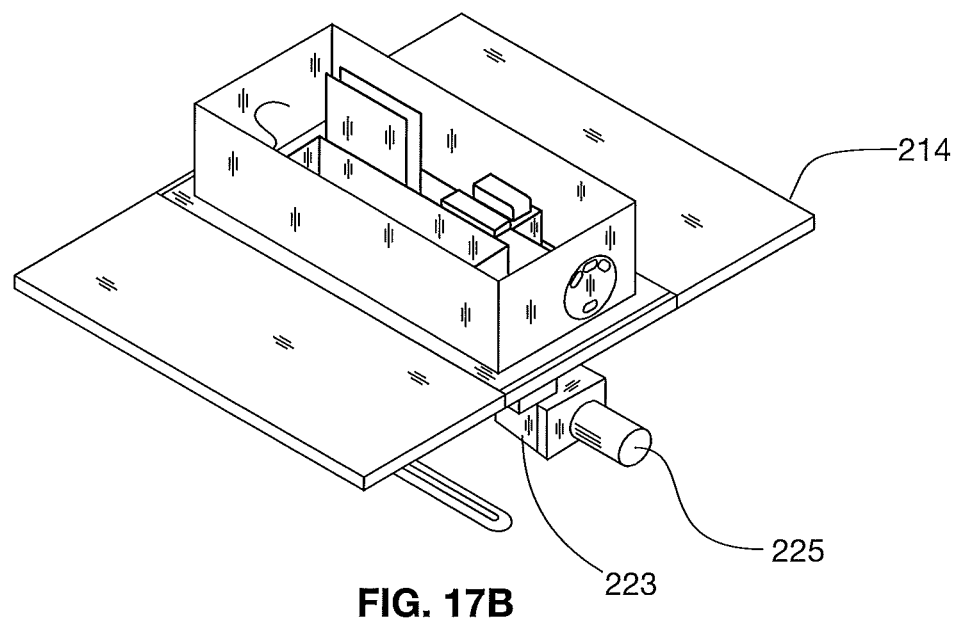
Figure 17C:
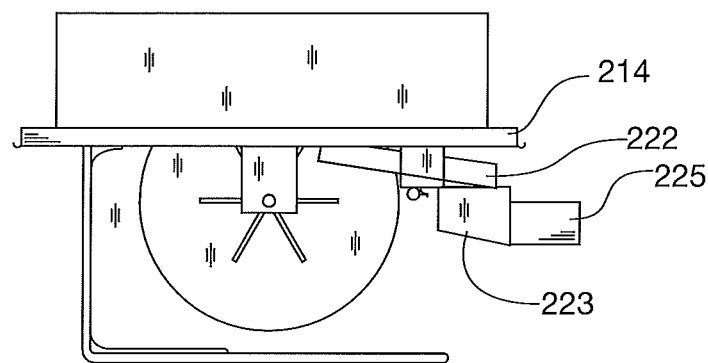
Figure 17D:
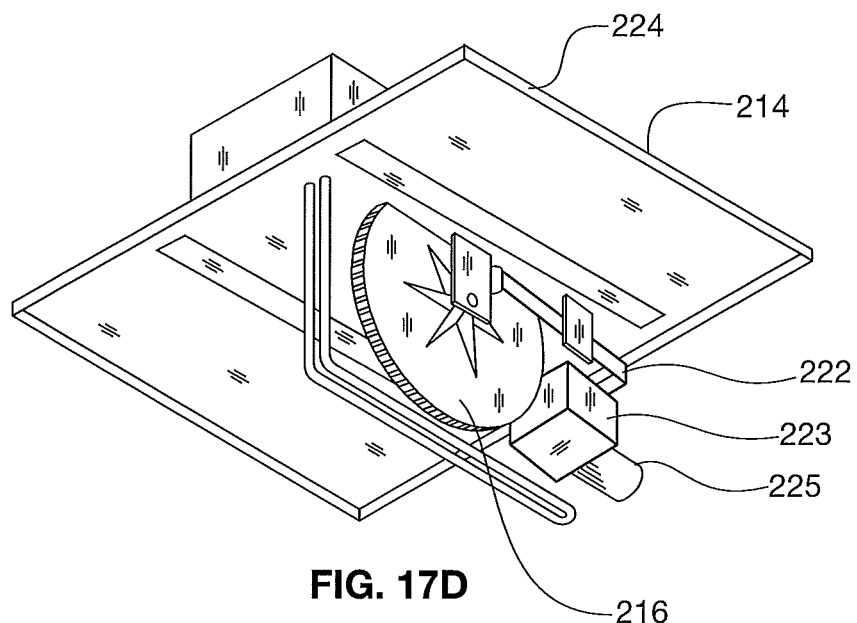
Figure 17E:
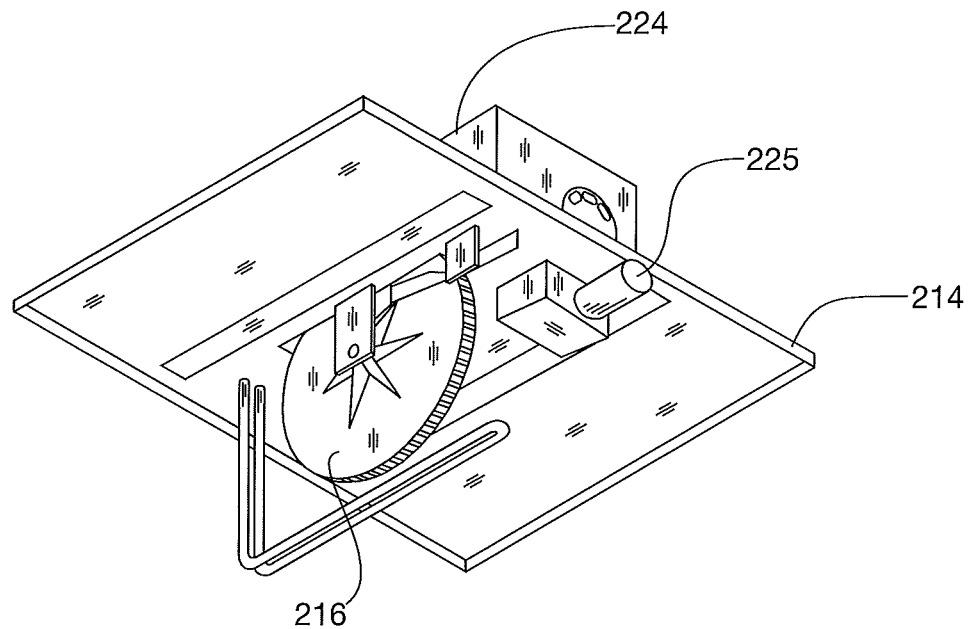

Alternate power supply fittings can be seen in FIGS. 13-15. FIGS. 13 and 14 show views of plug-in and hard-wired arrangements respectively. A customer's choice of one version or another can be easily accommodated by using one or the other of plates 170 or 172 with the components as described herein when assembling the main sectional cover. Both plates are provided with covers 174 over possible future electrical or signaling connections. The plate 170 of the embodiment of FIG. 13 is provided with a line cord 176, enabling the apparatus to be plugged into a wall socket. The plate 170 is secured to the remainder of the shield by screws 178 passing through drilled and tapped holes 180. The plate 172 of the embodiment of FIG. 14 is provided with a recessed male plug 17. At the stage seen in FIG. 14, the plate 172 is unsecured to the remainder of the shield, although it is also drilled and tapped with holes 180. As seen in FIG. 15, a junction box 181 is provided with a protruding female plug 182 as well as a plate 186 that has holes 184 positioned to align with holes 180 when the plugs 178 and 182 are joined. At that stage, screws can be inserted through holes 184 and 186 to hold the plate and junction box to the shield, securing the electrical connection against a user disconnecting power to the system. Those screws also hold the plate 172 to the remainder of the shield. Of course, conduit and electrical wiring can be used in the junction box 181 in conventional fashion.

Figure 18A:
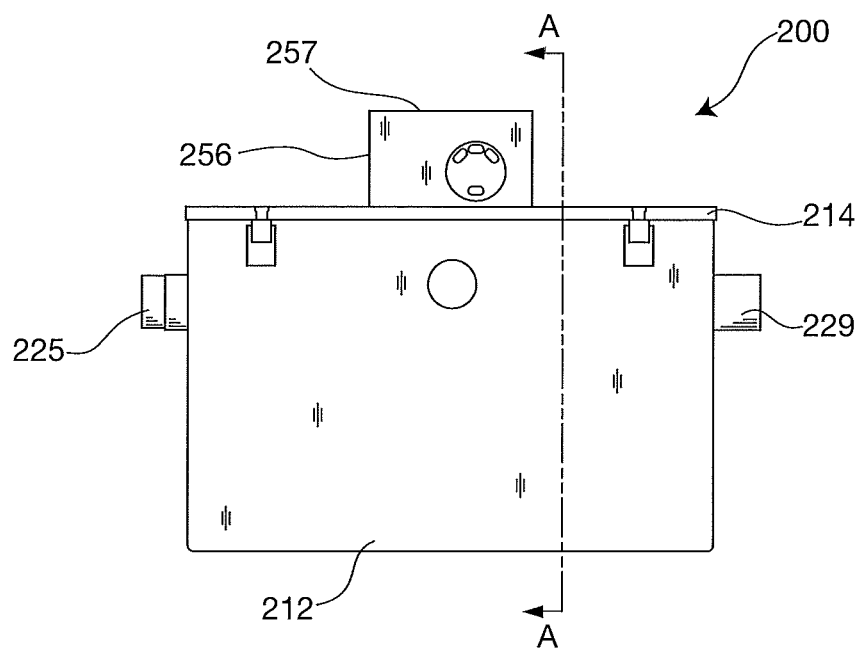
FIG. 18A-B are side and cut away views of one example of the assembly of FIG. 16.
Figure 18B:
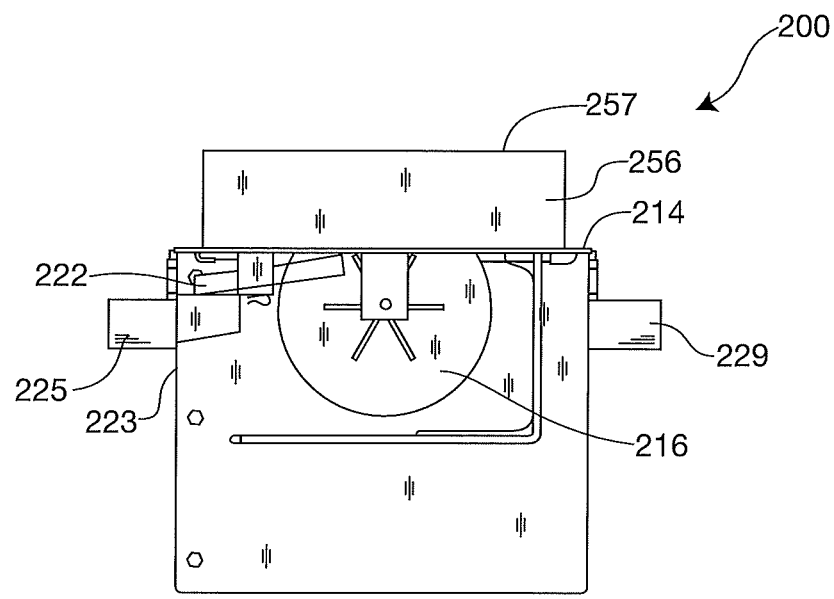
Figure 19A:
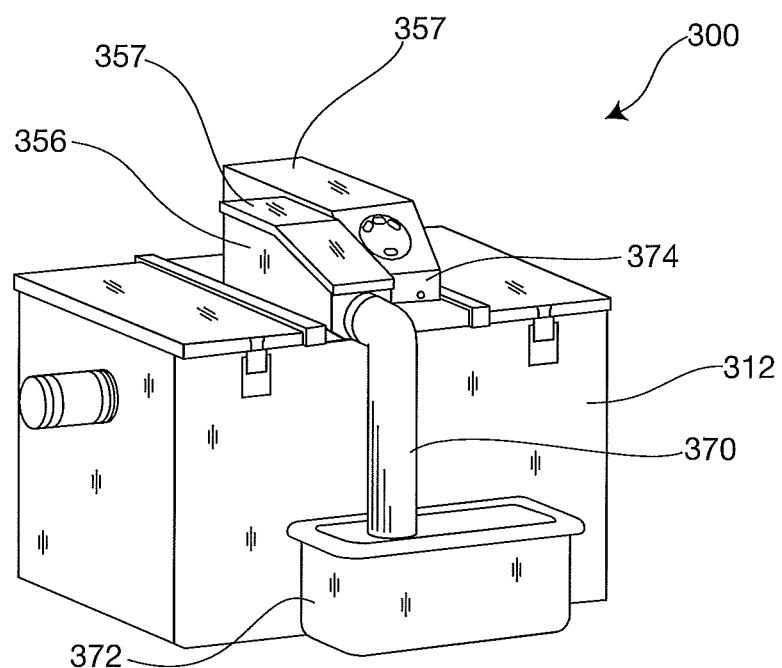
FIG. 19A-E are various views of another embodiment of one example of a sealed assembly.
Figure 19B:
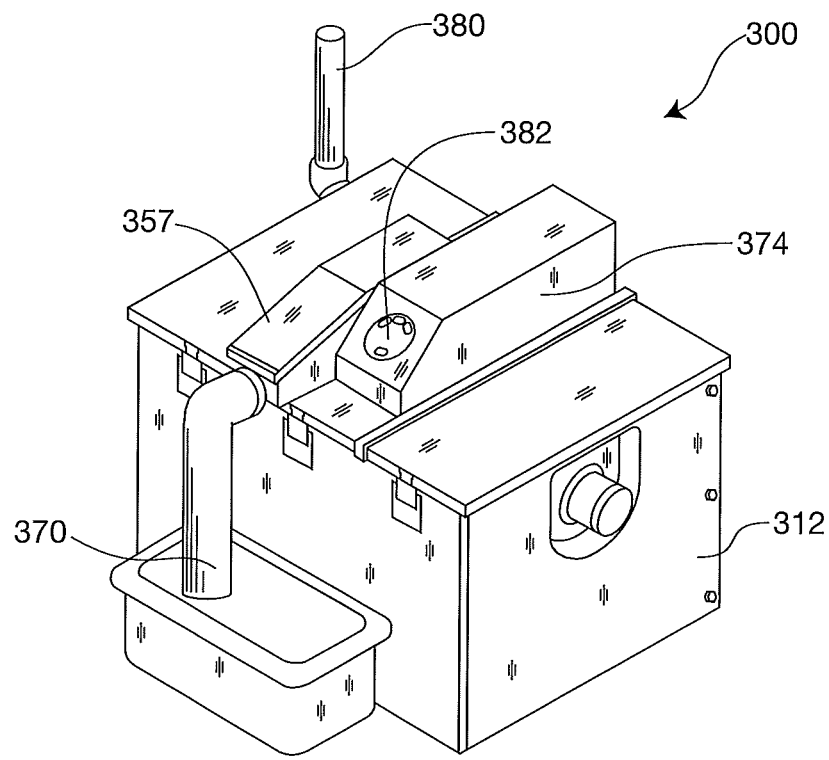
Figure 19C:
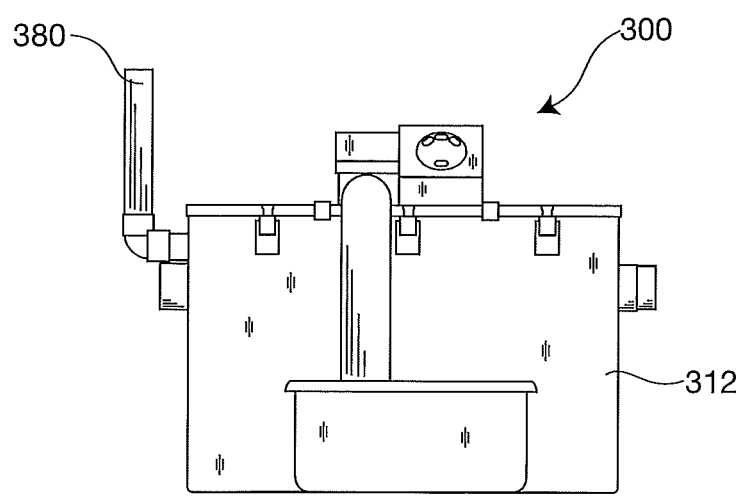
Figure 19D:
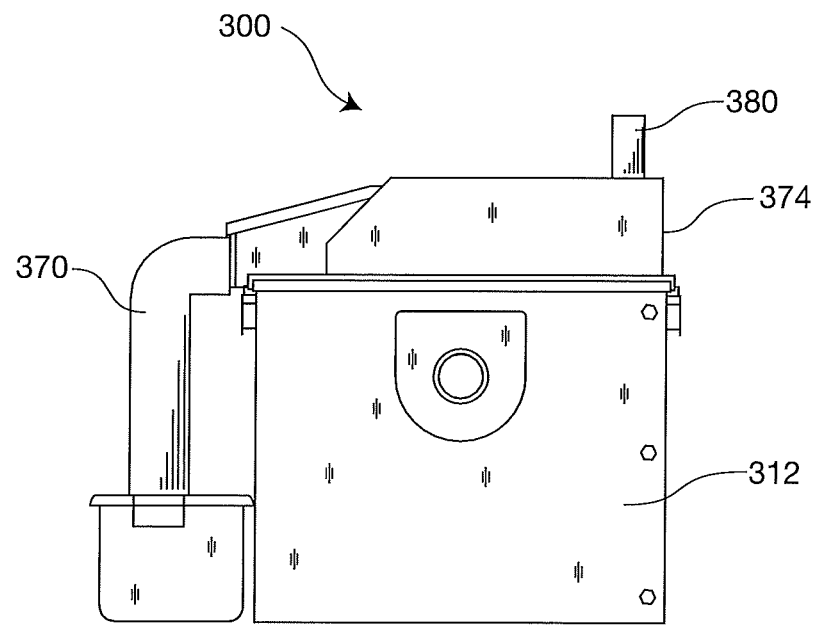
Figure 19E:
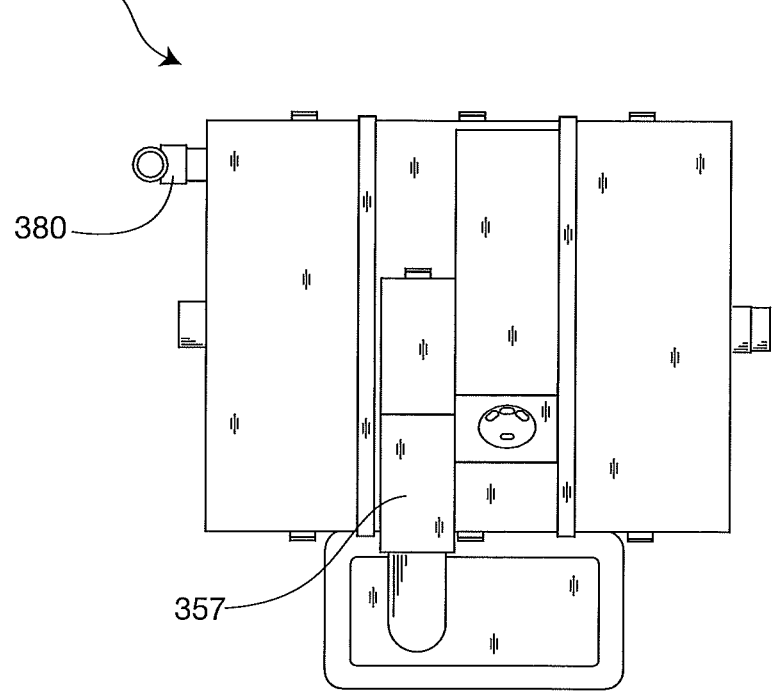

In some embodiments, the oil, grease and solid removal assembly 200 is a sealed assembly, some examples of which are shown in FIGS. 16-18. The sealed assembly 200 creates an internal enclosure within the assembly, such that the separation of fats, grease and oil proceed with minimal escape of vapors to outside the assembly. In one example of a sealed assembly, an enclosure 256 encloses the portions of the assembly above and/or attaching to and extending upward from the cover 214, essentially replacing and making unnecessary the shields 56, 58. Enclosure 256 includes a top 257 to enclose the portions of the assembly attaching to and/or extending upward from the cover 214. The top 257 may be a gasketed top, such that the top 257 and enclosure 256 form the sealed enclosure cooperatively with the sealed container 212, with the seal being formed to prevent the egress of vapors from the container 12. The sealed enclosure 256 may be open to the interior of the container 212 with the rotatable disk 216 extending between the sealed enclosure and the sealed container 212. The sealed enclosure may be multiple sealed compartments, joined or separate from each other.

The scraper blade 224 and the trough 222 may be located below the cover 214. The scraper blade 224 and trough 222 may be supported by the underside of the cover 214. In operation, the scraper blade 224 and trough 222 operate similarly to scraper blade 24 and trough 22 of the embodiment mentioned above. The inferior location of the scraper blade 224 and trough 222, below the cover 214, allows a more compact enclosure 256. With the trough 222 below the cover 214, a trough extension 223 may be added. Extension 223 can mount on the inside faces of a sidewall of container 212 and lead through the sidewall to outlet 225. A trough extension 223 may extend from, be secured to, or adjoin to trough 222 and carry the grease out of the container 212 by way of a grease outlet 225. Trough 222 and extension 223 can be configured as a single trough.

The cover 214 may be a sectional cover, as shown in FIG. 1 as 14a, 14b and 14c. Additionally, the scraper blade 224 and trough 222 may be secured on a center section of the cover, for example the main sectional cover, so that the oil and grease removal components remain contained on one central sectional cover, the advantages of which were previously discussed. A secondary trough extension 227 and a secondary grease outlet 229 (see FIG. 16B), may be included on the opposite end of the container from the grease outlet 225. Secondary trough extension 227 and secondary grease outlet 229 allows a reverse placement of the central sectional cover so that the assembly can be selectively bi-directionally configured to empty grease into a storage tank on either side of the container, that is, the container has two substantially identical outlets 225 and 229, either of which can be used, with the other being idle. The idle grease outlet may be blocked, for example, include a stopper.

Grease outlet 225 adjoins and carries the separated grease to a grease storage tank (not shown). The connection between the outlet 225 and the storage tank includes a seal to prevent leakage and to maintain the enclosed assembly throughout the storage tank. In one example, the connection may include a seal as described in more detail in U.S. Pat. No. 8,273,255, the entirety of which is incorporated herein by reference. Such a seal includes a first seal point and a second seal point. The first seal point may include a one-half o-ring type fitting that fits into an annular recess of an outside face of the container. The seal point is secured to the container by the force of a clamping guide funnel to the container, such as by screws. A second seal point may include a gasket. The gasket is made of a resilient material and, by way of example, may be an elastic-type rubber piece. The gasket protrudes inwardly, in an uncompressed state, from the seal. A hub located on the storage tank interfaces snugly with a guide funnel and a port of the container so that at the seal point, the gasket is compressed radially and expands axially to form a water-tight sealing barrier around the circumference of the hub, also substantially inhibiting the escape of vapors at the connection between the container and the storage tank. Other seal configurations can be used.

In operation, the oil, grease and solid removal assembly 200 is connected to a drain from a sink or other device that discharges effluent water with waste materials to be separated. The water containing waste materials flows from the device's drain into the oil, grease and solid removal assembly 200 through an inlet pipe. A center section cover of cover 214, typically supports the oil and grease removal assembly. In the volume of the container 212 between the inlet and the outlet baffle 46, the effluent has time to reside, permitting oil and grease to rise to the top of the water. As the disk 216 rotates through the water, oil and grease are picked up on the sides of the disk 216. As the disk 216 rotates, the scraper blades 224 which are attached to the trough 222 remove the oil and grease from the sides of the disk 216. The oil and grease flows down the trough 222 and trough extension 223 and out a grease outlet 225 to an oil and grease storage container (not shown). Once the oil and grease have been removed from the effluent water, the grey water flows downstream under the baffle outlet and exits the oil, grease and solid removal assembly 200 through the outlet pipe 28 into the sewage system.

In another example of a sealed assembly 300, as seen in FIGS. 19A-19E, 20 and 21, the sealed assembly includes a skimming wheel enclosure 356 that encloses the skimming wheel portions of the assembly above and/or attaching to and extending upward from the cover 314. Enclosure 356 includes a top 357 to enclose the portions of the assembly attaching to and/or extending upward from the cover 314. The top 357 may, similarly to top 257, be a gasketed top, such that the top 357 and enclosure 356 form the sealed enclosure cooperatively with the sealed container 312, with the seal being formed to prevent the egress of vapors from the container 312. The top 357 may have hinged sections, rotatable sections and/or, by way of example separable sections. The sealed skimming enclosure 356 may have a FOG hose 370 attached with a sealed connection, as described above in other examples, directing the FOG away from the skimmer and out of the sealed skimmer enclosure 356 and to a grease storage tank 372. Grease storage tank 372 may take on any of a variety of shapes and sizes as accommodated by the assembly.

Figure 20:
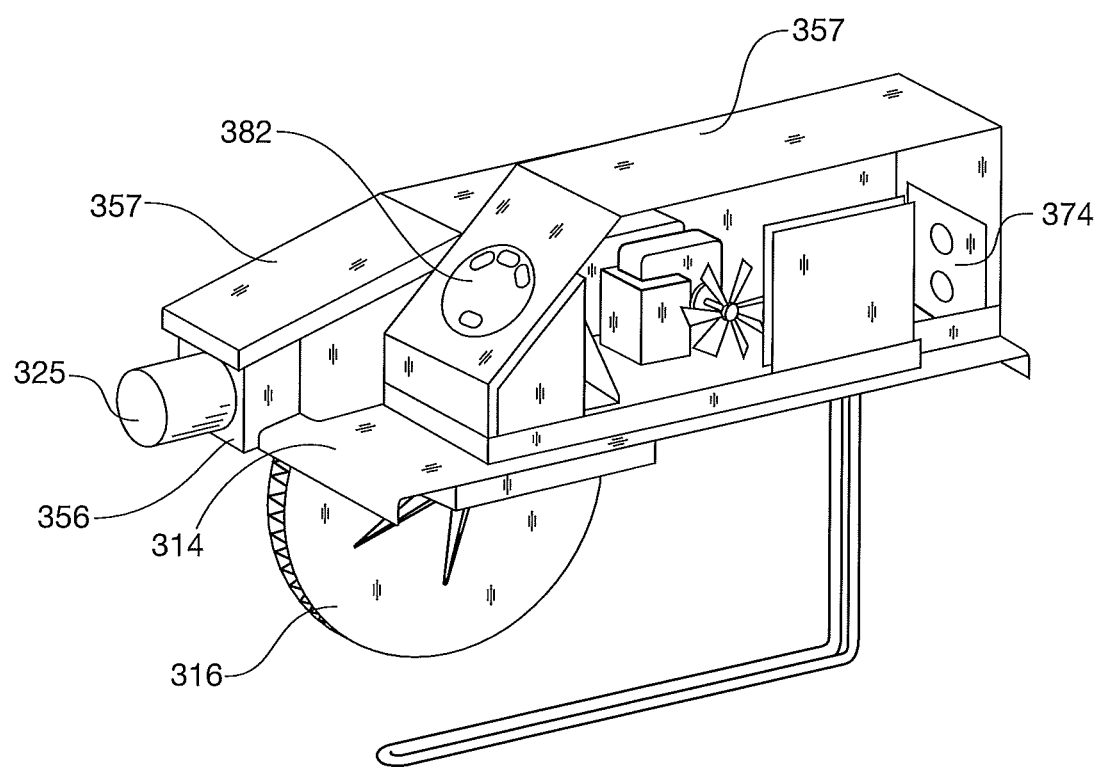
FIG. 20 is a perspective view of one example of a skimmer enclosure and a control enclosure according to the assembly of FIG. 19.
Figure 21:
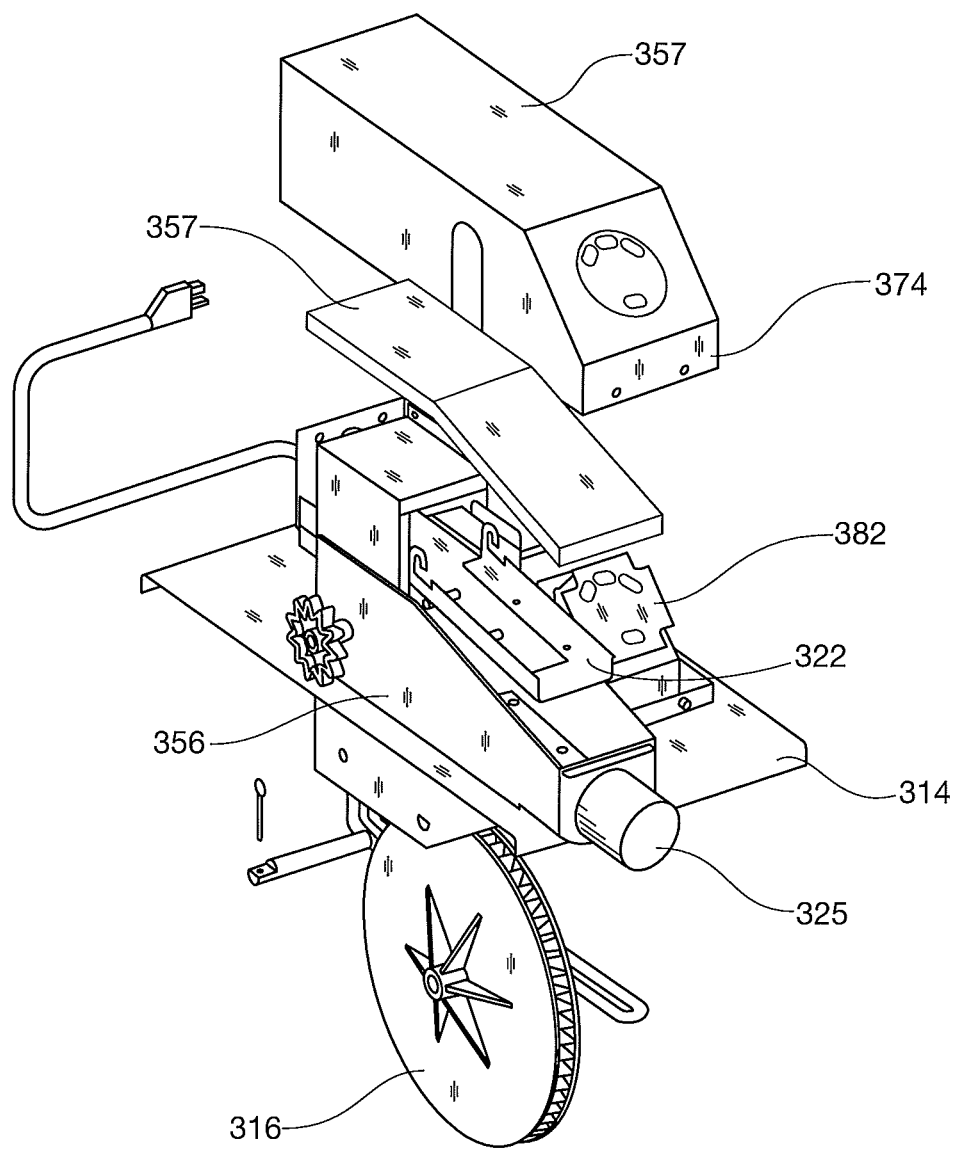
FIG. 21 is an exploded view of one example of the skimmer enclosure according to FIG. 20.
Figure 22A:
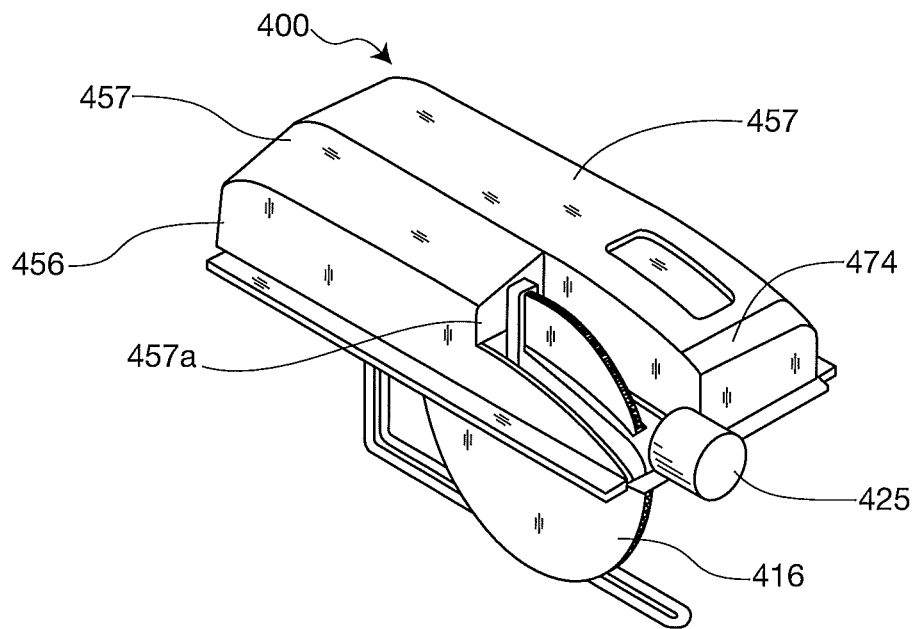
FIG. 22A is a perspective view of one example of a compact unit including a skimmer module.
Figure 22B:
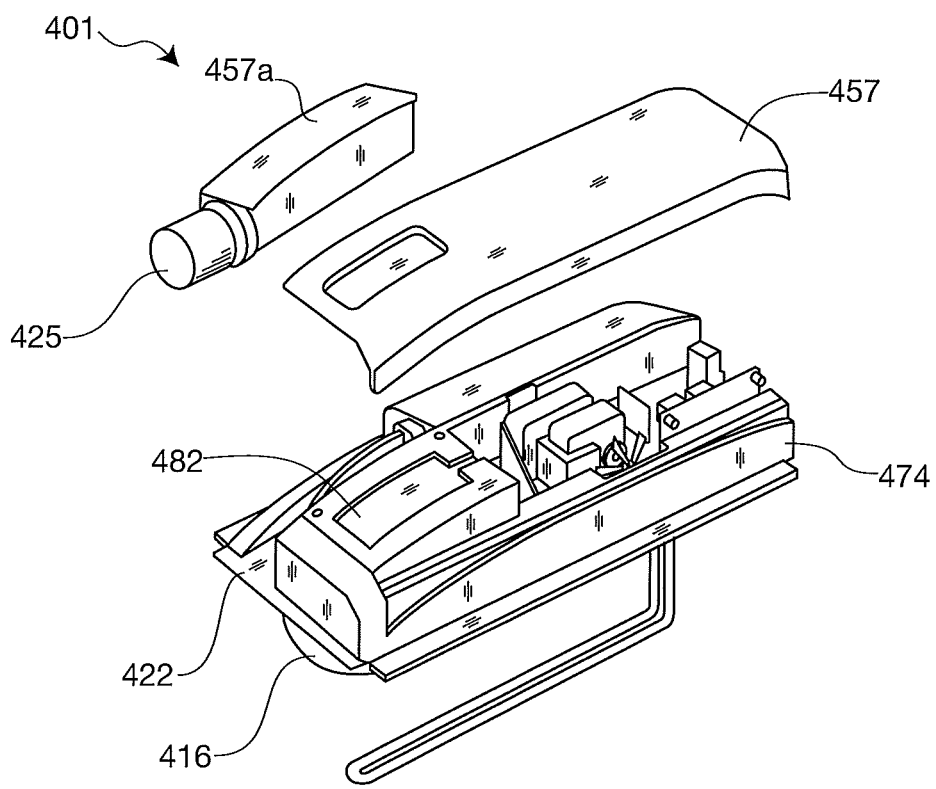
FIG. 22B is an exploded view of one example of the unit of FIG. 22A.
Figure 22C:
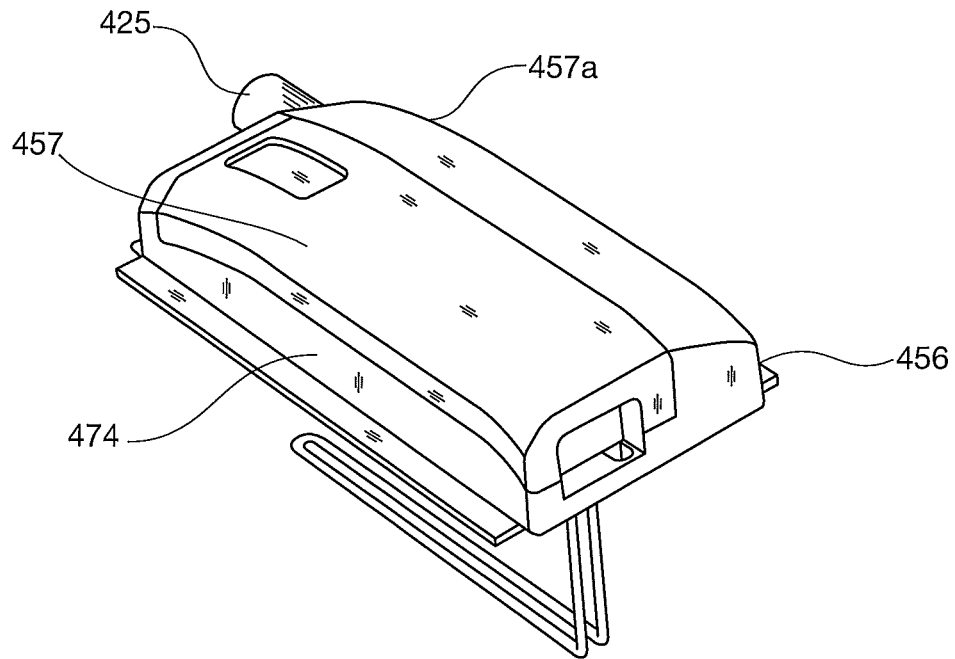
FIG. 22C is a top view of one example of the unit of FIG. 22A.
Figure 22D:
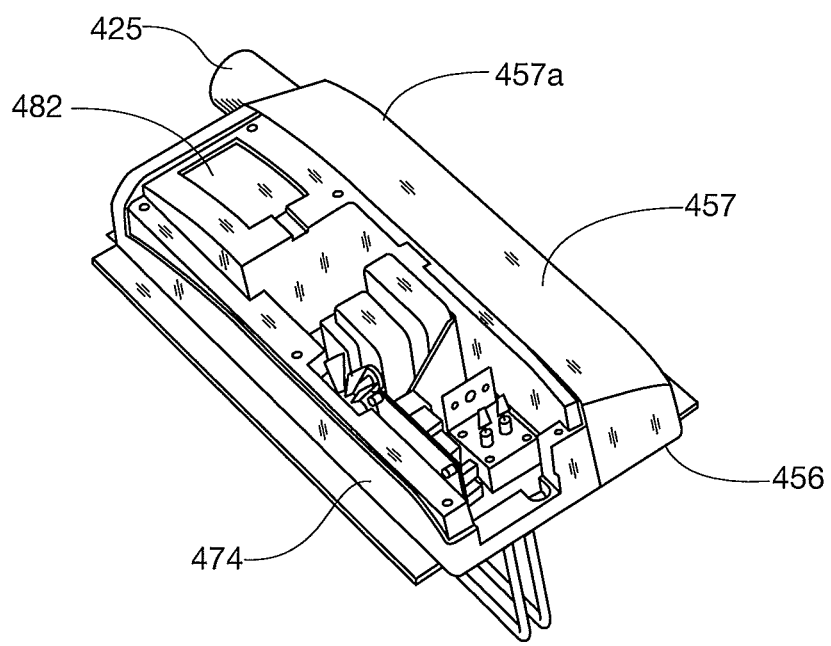
FIG. 22D is a top view of one example of the unit of FIG. 22A with the skimming top removed.
Figure 22E:
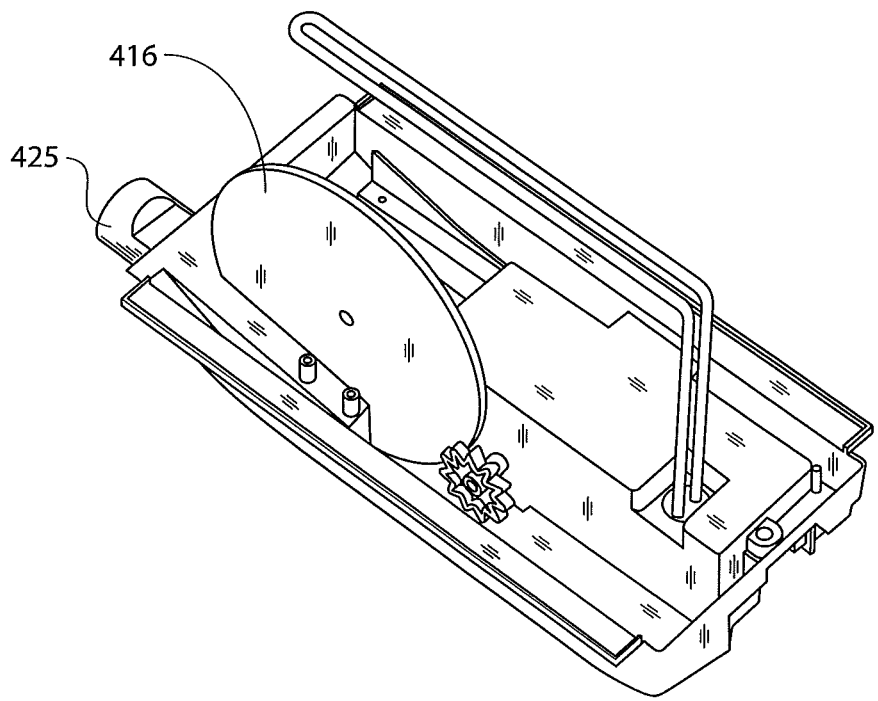
FIG. 22E is a bottom view of one example of the unit of FIG. 22A.
Figure 22F:
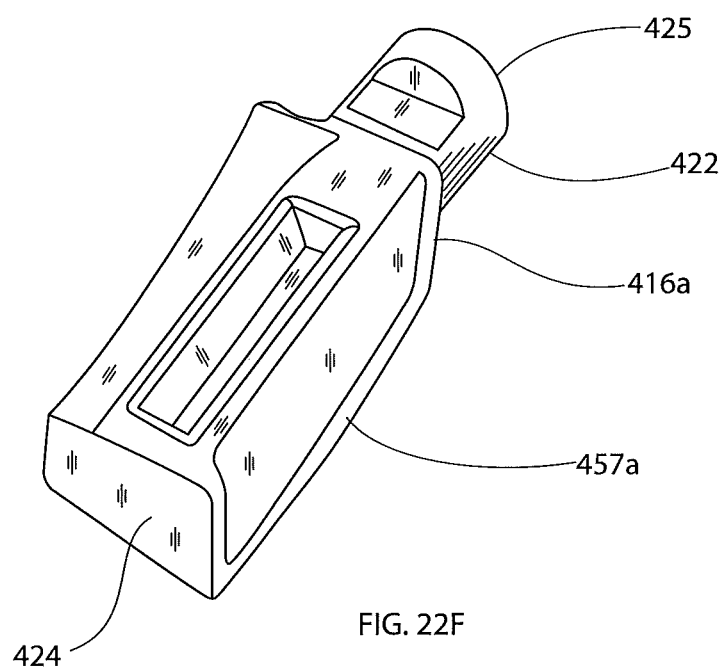
FIG. 22F is a perspective view of one example of a skimming module according to the unit of FIG. 22A.

As seen in FIG. 20, a grease outlet 325 may be incorporated into and/or above the cover 314. In this example, a secondary extension trough may not be necessary and all or a portion of the trough may be incorporated with the outlet 325, such as forming a one piece, continuous trough/outlet. The skimming enclosure 356 may form a chamber around the top portion of the skimming wheel that attaches to grease storage tank 372 through the sealed hose connections. A removable top 357, over the sealed skimming enclosure, allows access to the scraper blades 224. Generally, the top 357 latches in place and may have a gasketed interface with the sealed container.

There may also be a sealed user control enclosure 374. The user control enclosure 374 may be separated from the skimming enclosure 356. Generally, the control enclosure 374 houses the control electronics and user controls 382. The user controls 382 housed within the enclosure 374 may operate to allow a user to control/adjust a skim cycle to separate grease from effluent within the assembly 300. A top 357 may cover all or a portion of enclosure 374. The top 357 over the enclosure 374 may include a hinged portion.

The enclosure 356 and 374 may be, by way of example, stainless steel and may be bolted or screwed to cover 314. Tops 357 may be latched into place, and/or by way of example, hinged, clasped, overlapping, gasketed, and/or fitted. The assembly may be sealed such that a minimal amount and/or no smoke escapes during a smoke test, a test which is known in the art to allow visualization of smoke that may escape an assembly when a seal is not complete. For example, in a smoke test, a squirrel cage blower discharges into a run of piping. A FOG separation and removal assembly is connected in the center of the piping run. A manometer is attached just downstream from the assembly. A valve at the end of the piping run is adjustable so that 1" WC (water column) pressure is accomplished in the piping and assembly. A smoke bomb is set off at the intake of the blower and piping run so that the assembly is filled with smoke. Air leakage from the assembly shows up with visually detectable smoke.

The assembly 300 may include a vessel vent 380 that adjust pressures so that pressures will not build up inside the assembly 300. The vent 380 allows for movement of the air in the headspace within the assembly in and out of the assembly. The vent 380 may connect on its distal end to a facility vent. Vent 380 may also, for example, be vented to a carbon filter or vent to another location, such as outside the facility.

Any of the assembly examples may include a wrap around the assembly. The wrap may be stainless steel and may surround a rotomolded container 312. The wrap may cooperate with the rotomolded container to create a sealed environment.

The skimming enclosure 356 and the control enclosure 374 may both attach to a portion of the cover 314 as to form a single unit that may be placed on top of the container 312. The unit may complete a sealed environment within the assembly. In one example, the grease outlet being above the top of the container 312, allows the unit to be bi-directionally configurable. The unit can be mounted with its outlet to one side or to the other side, to empty grease into a storage tank on either side of the container without the need for a secondary outlet on the other side of the tank. The grease outlet 325 may serve as the outlet on both sides of the tank without the need for accessory outlet parts duplicated on both sides of the container.

In one example, the assembly may include a compact unit 400 (see FIGS. 22-24 generally). The compact unit 400 may allow for a lower profile on the top of the sealed assembly. The unit 400 my include a scraper module 401. The scraper module may be self-contained and generally includes at least one scraper blade(s) 424, a grease outlet 425 and a top 457*a*. The scraper blades 424, outlet 425 and top 457*a* may be attached and/or formed as a one-piece module. The module 401 is removable, simplifying cleaning and maintenance of usually greasy and hard to manage parts. The module 401 may form a sealed unit around the disk 416 that joins a tube (not shown) and directs skimmed grease into a grease storage tank. The blades 424 may be attached as to be replaceable. The unit 400 may be a sealed unit.

The unit 400 may also include a trough 422. Trough 422 may have a ramp angling downwardly from the skimmer toward the outlet 425 of the skimmer module 401. The trough 422 may be built into the skimming enclosure 456. The trough may empty into the outlet portion of the skimmer module 401. The unit 400 may be easily reversed so that skimming and removal of grease into a storage tank is possible on either side of the assembly.

The unit 400 may include a skimmer module 401, a skimmer enclosure 456 and a sealed control enclosure 474. The skimming enclosure may have a top 457. The sealed control enclosure 474 may have a top 457.

Figure 23A:
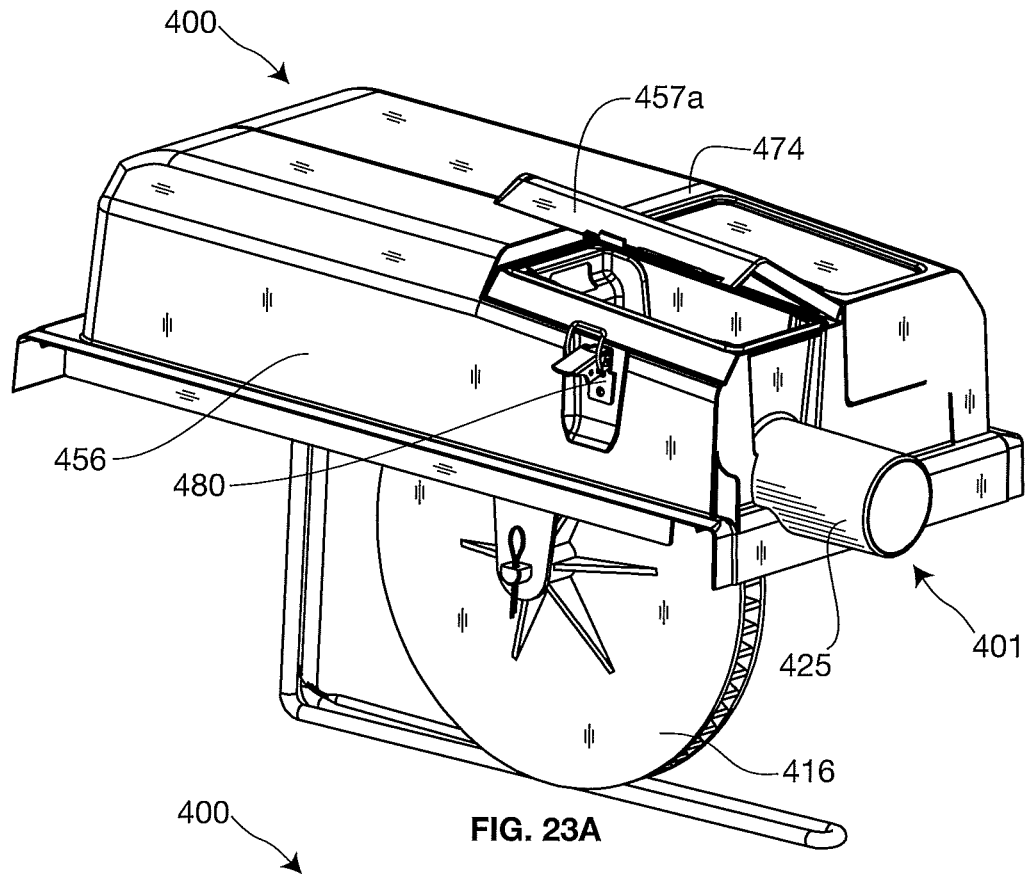
FIG. 23A is a perspective view another example of a compact unit.
Figure 23B:
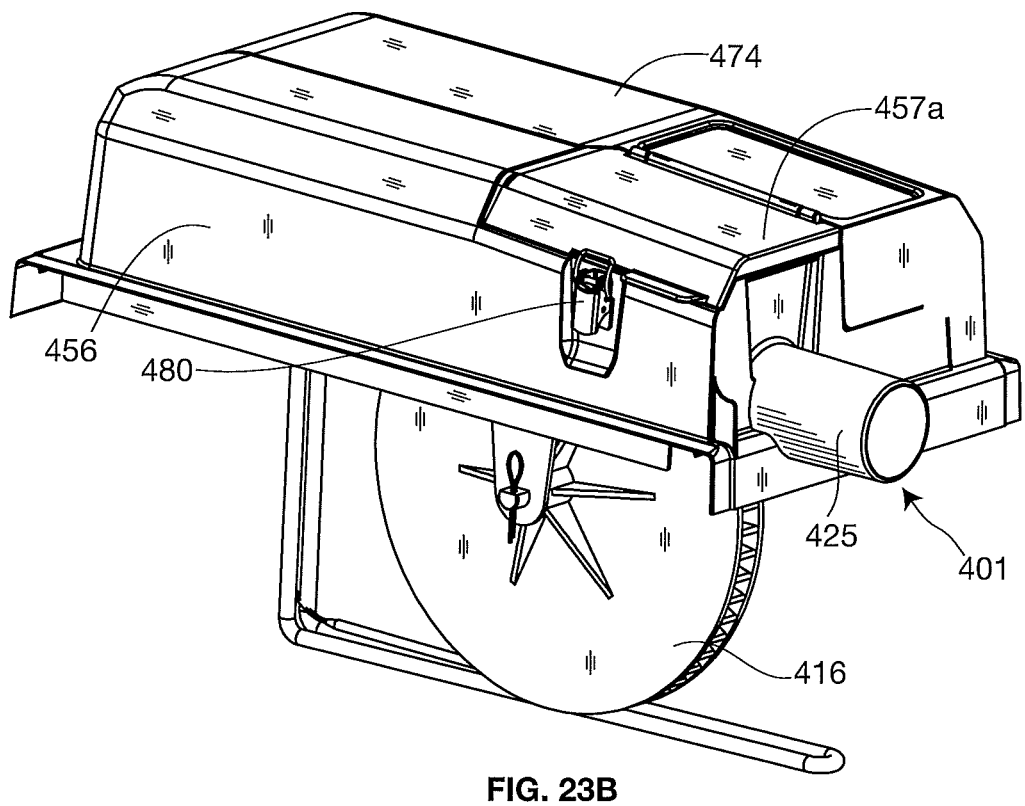
FIG. 23B is another perspective view of the compact unit of FIG. 23A.

Unit 400 may include a skimmer enclosure 456 with a latch top 457*a*, as shown in FIGS. 23A and 23B. The latch 480 may contribute to the sealing of the unit 400 to the container 12 or between sealing of the top 457*a* and any other portion of the unit 400, including the skimmer enclosure 456. In other embodiments (see FIGS. 24A-C) a seal between the top 457*a* and the skimmer enclosure and/or the container 12 may be established and/or aided by a magnetic closure 411.

Figure 24A:
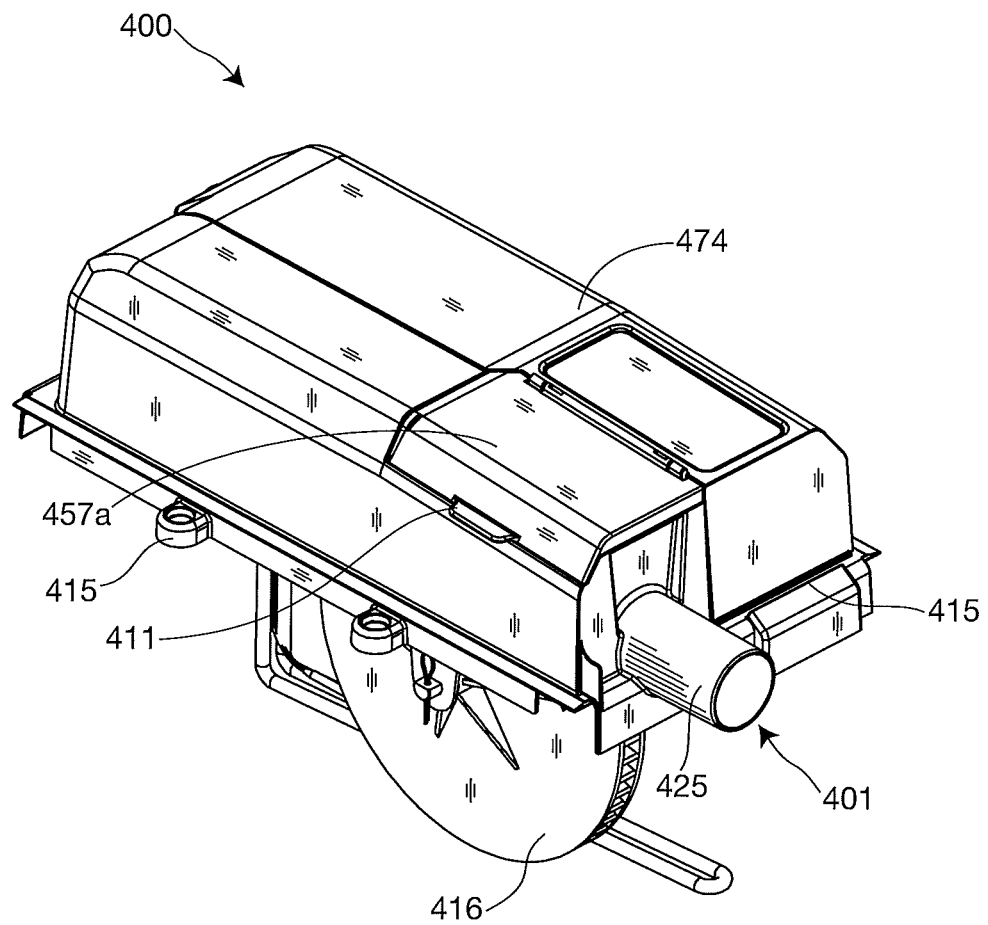
FIG. 24A is a perspective view another example of a compact unit.
Figure 24B:
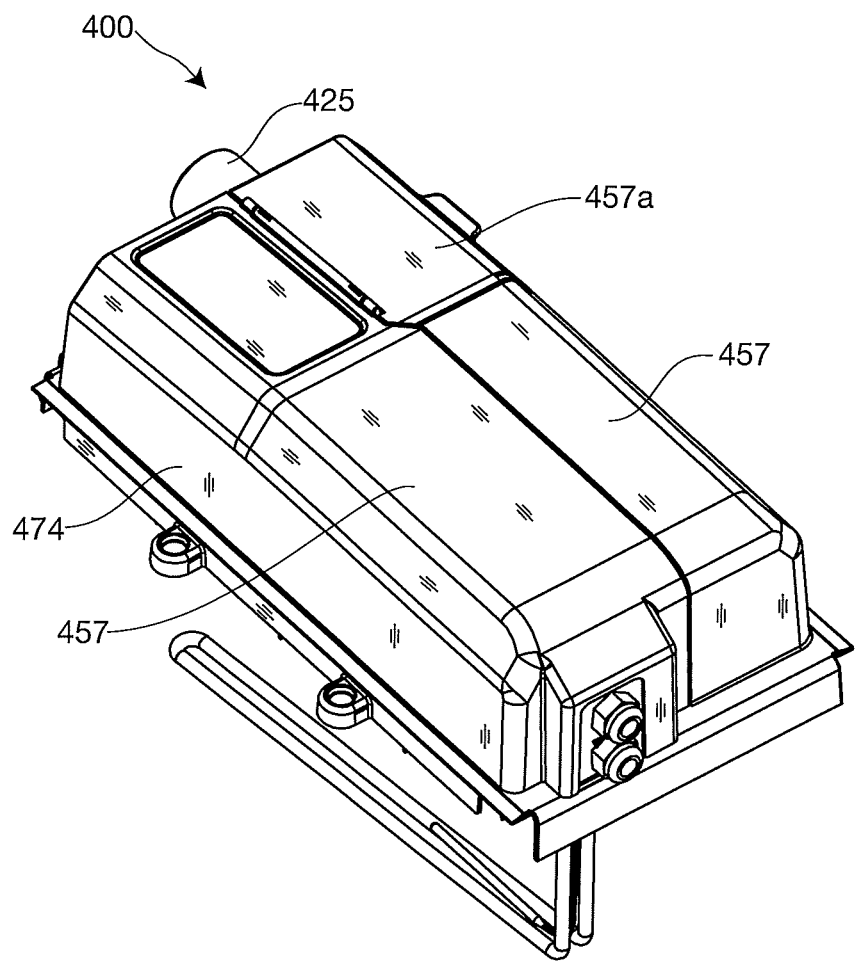
FIG. 24B is a back view of one example of the compact unit of FIG. 24A.
Figure 24C:
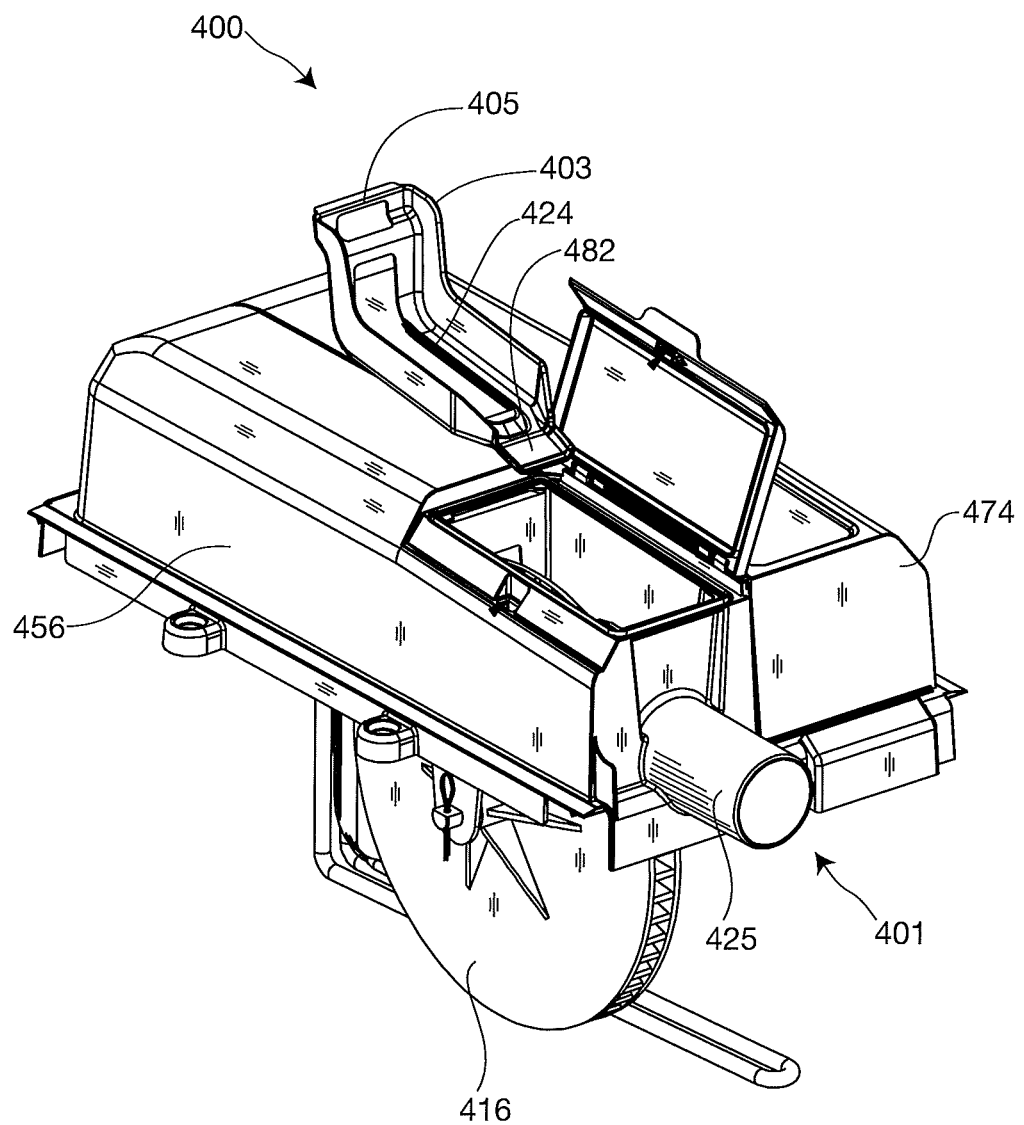
FIG. 24C is a perspective view of one example of the compact unit of FIG. 24A showing a wiper portion.
Figure 24D:
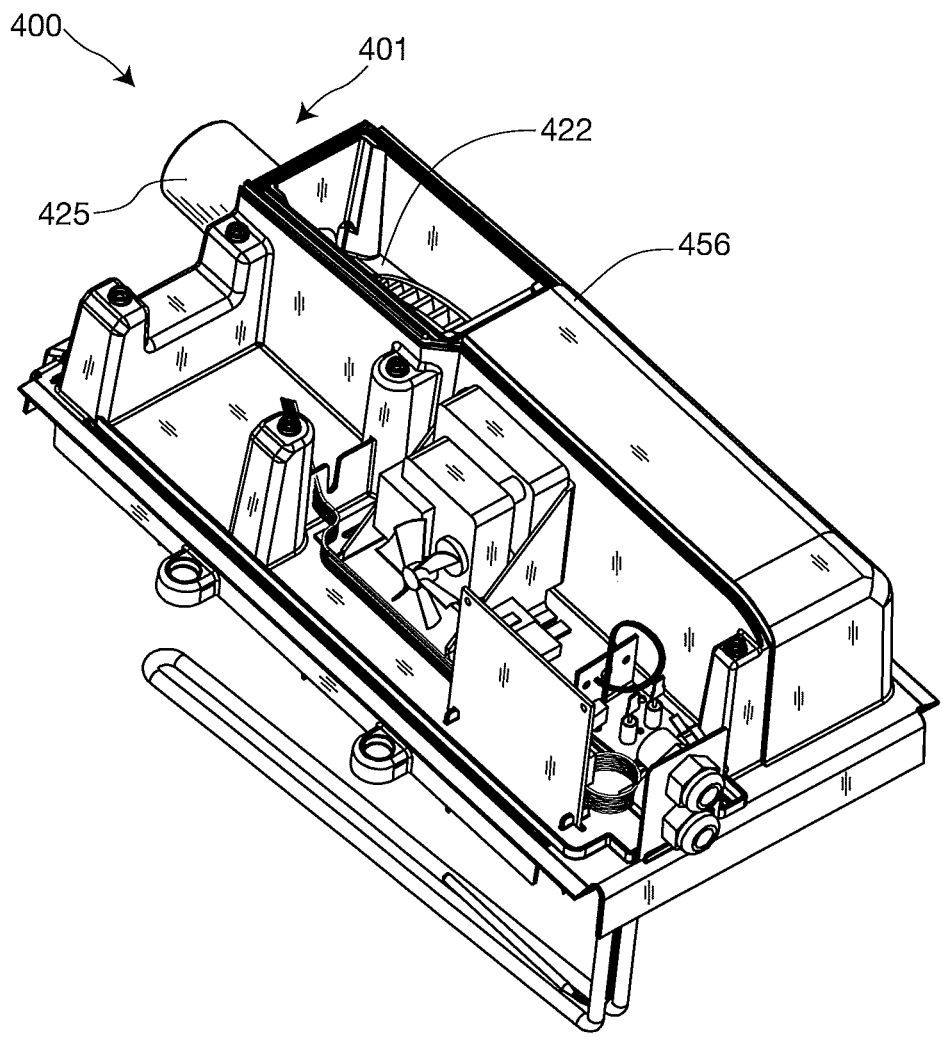
FIG. 24D is a perspective view of one example of the compact unit of FIG. 24A with a top removed.
Figure 24E:
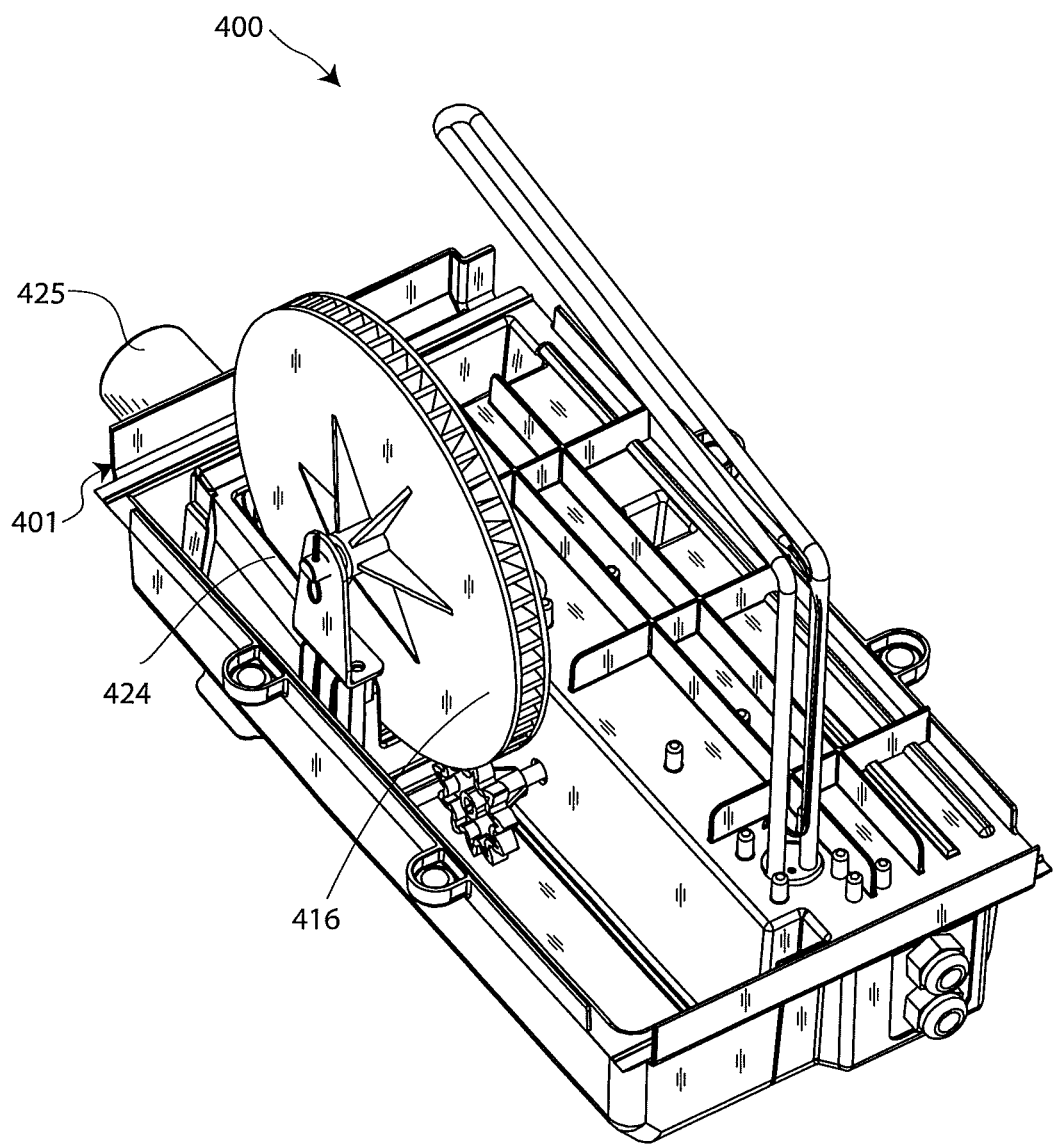
FIG. 24E is a perspective view of one example of the compact unit of FIG. 24A with the inside of the sealed unit exposed.
Figure 24F:
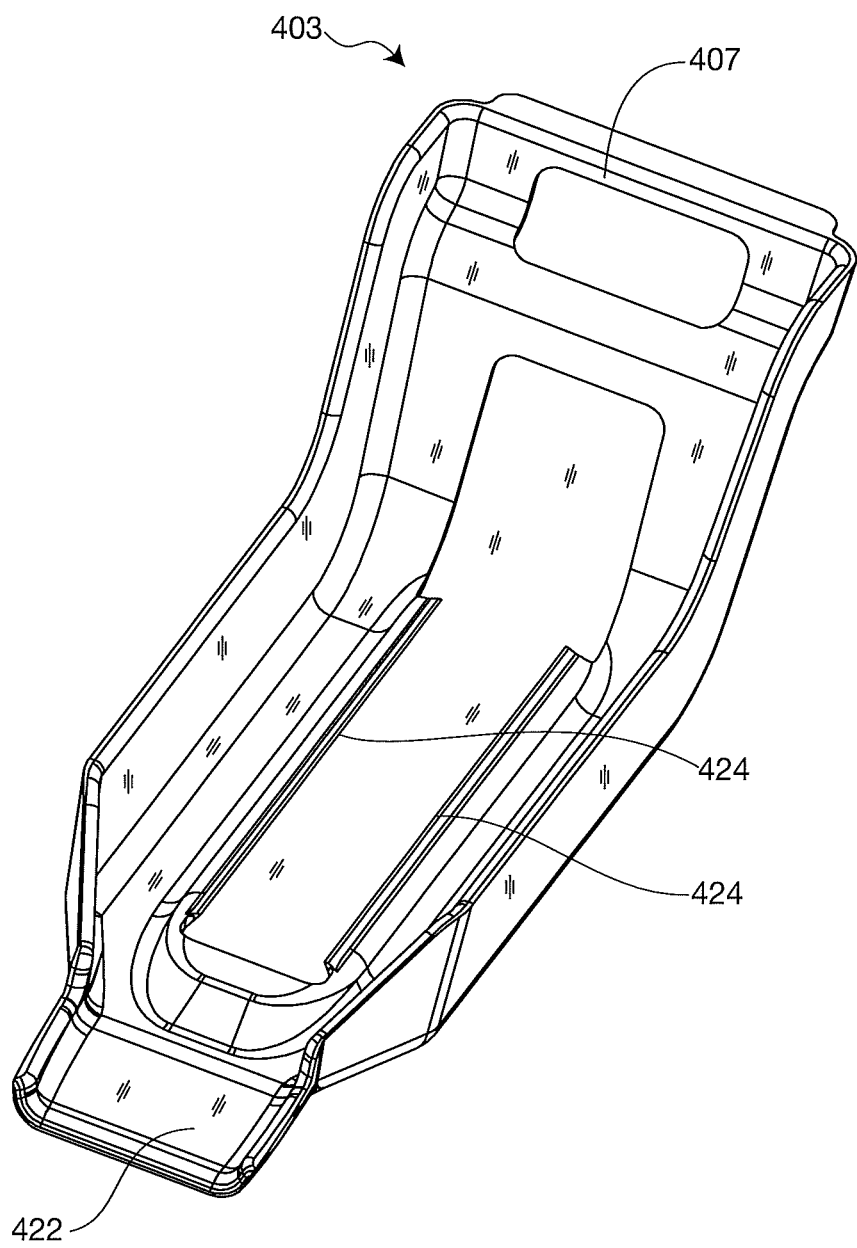
FIG. 24F is a perspective view of one example of a removable wiper portion of FIG. 24A.

The skimmer module 401, skimmer enclosure 456 and/or the control enclosure 474 may each or all include one or more magnetic closures for establishing a sealed unit. Applicant has found that making a more sealed assembly may noticeably decrease odors escaping the assembly; however, creating a sealed assembly that still allows access to the interior for cleaning or servicing, created new challenges. In FIGS. 24A-B a magnetic closure 411 assists in establishing a seal between the skimmer unit 456 and the top 457a. The top 457a, in this example, is hinged to open and allow access to the inside of and parts housed within the skimmer unit, for example, the disk and blades. In other examples, the container 12 or a top 457 may include pockets 415 for housing magnets/magnetic connections.

Figure 25A:
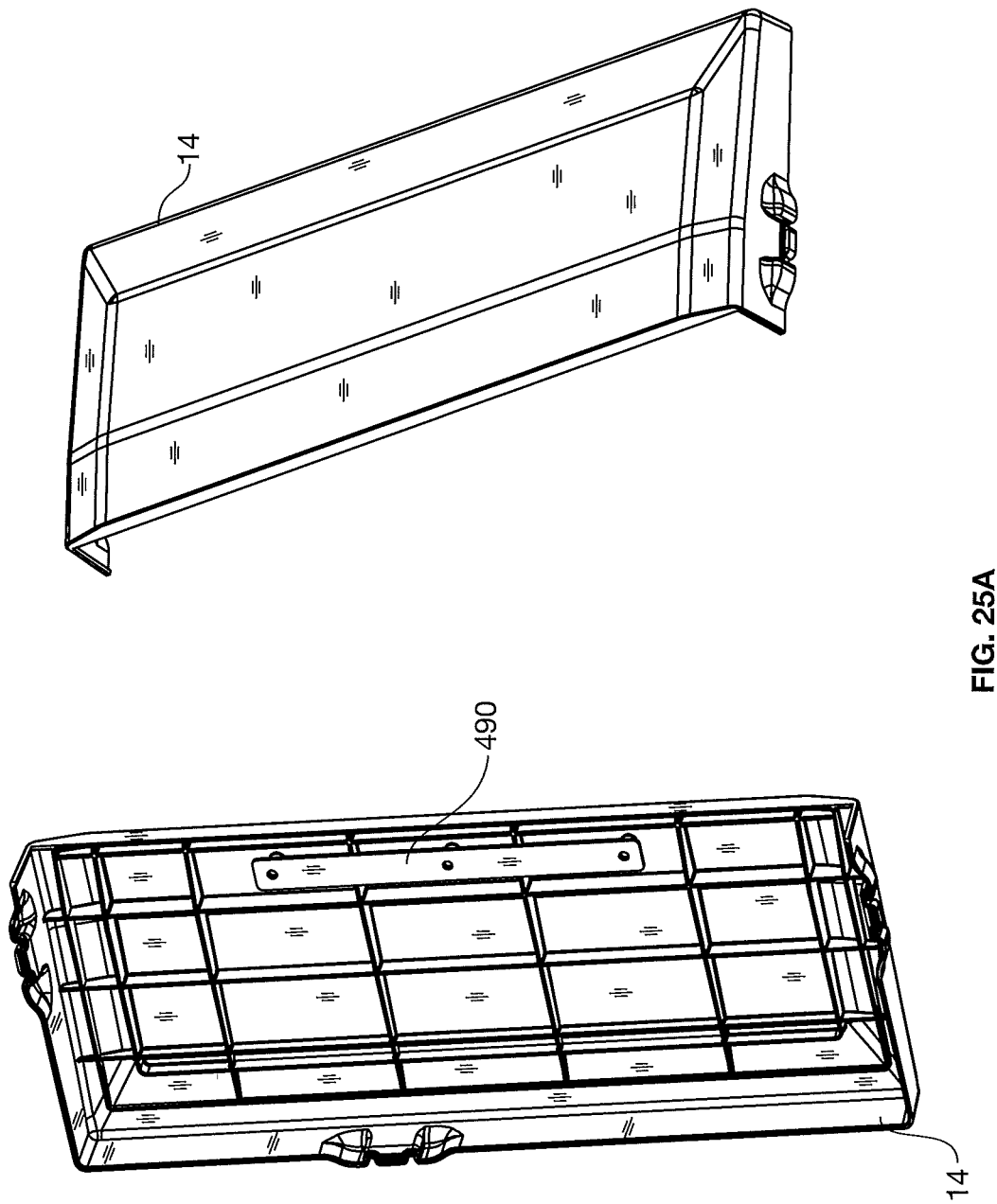
FIG. 25A is a top and bottom view of one example of a sectional cover for the container according to the disclosure.
Figure 25B:
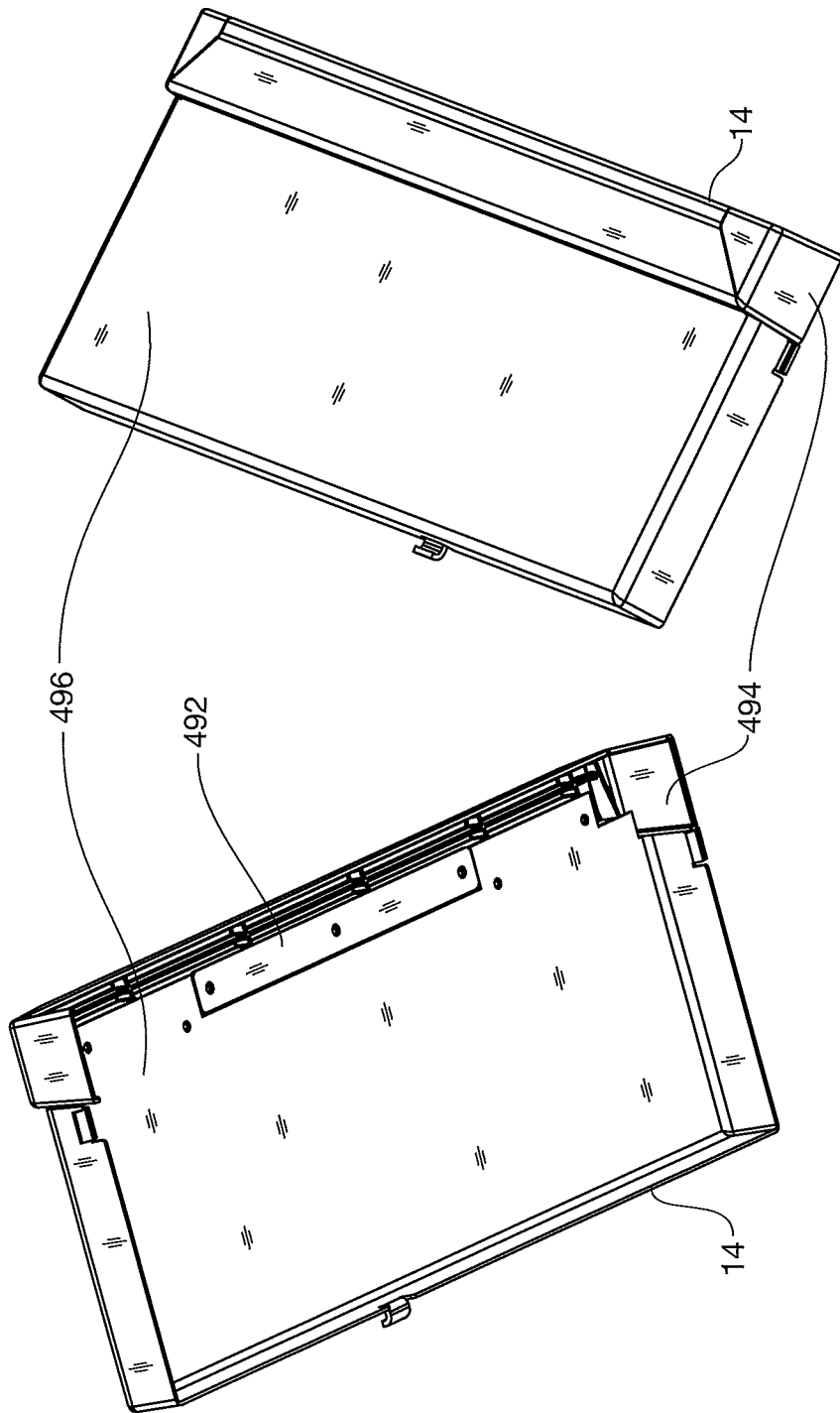
FIG. 25B is a top and bottom view of another example of a sectional cover for the container according to the disclosure.

FIGS. 25A-B show one example of a cover including a magnetic closure system for establishing a seal between the cover 14 and the container 12. The magnetic closure system may include a magnetic attraction plate 490, on either the cover or the container 12. The cover 12 may be, by way of example, injection molded and/or a hybrid, stainless and plastic combination cover. FIG. 25A shows an example of an injection molded cover 14 and FIG. 25B shows a cover 12 having a stainless component 496 and a plastic component 494.

Control enclosure 474 may include a keypad control interface 417. The keypad interface may be a membrane keypad interface. Control enclosure 474 may also include a first interface 415 for securing a grease storage tank. The first interface may be, by way of example, a step, a latch, a magnet and/or a plate.

The skimmer unit 456 may include a wiper portion 403. Wiper portion 403 may be removable. Wiper portion 403 may include one or more scraper blades 424. The scraper blades 424 may be medially located and/or mounted on the wiper portion 403. The trough 422 may also extend from wiper portion 403. The trough 422 may serve as a grease discharge chute that guides the oil/grease toward an oil/grease storage tank. A handle 407 may extend from the wiper portion 403 so that the wiper portion 403 is easily removed to replace blades 424 and/or for cleaning and repair. In some examples, the handle and the trough 422 may be distally located on the wiper portion on opposite ends of the wiper portion. The blades 424 may be centrally located within the wiper portion 403, and in some examples, the blades 424 may be located on the wiper portion central to the handle 407 on one end and the trough 422 on the opposite end of the wiper portion.

Figure 26:
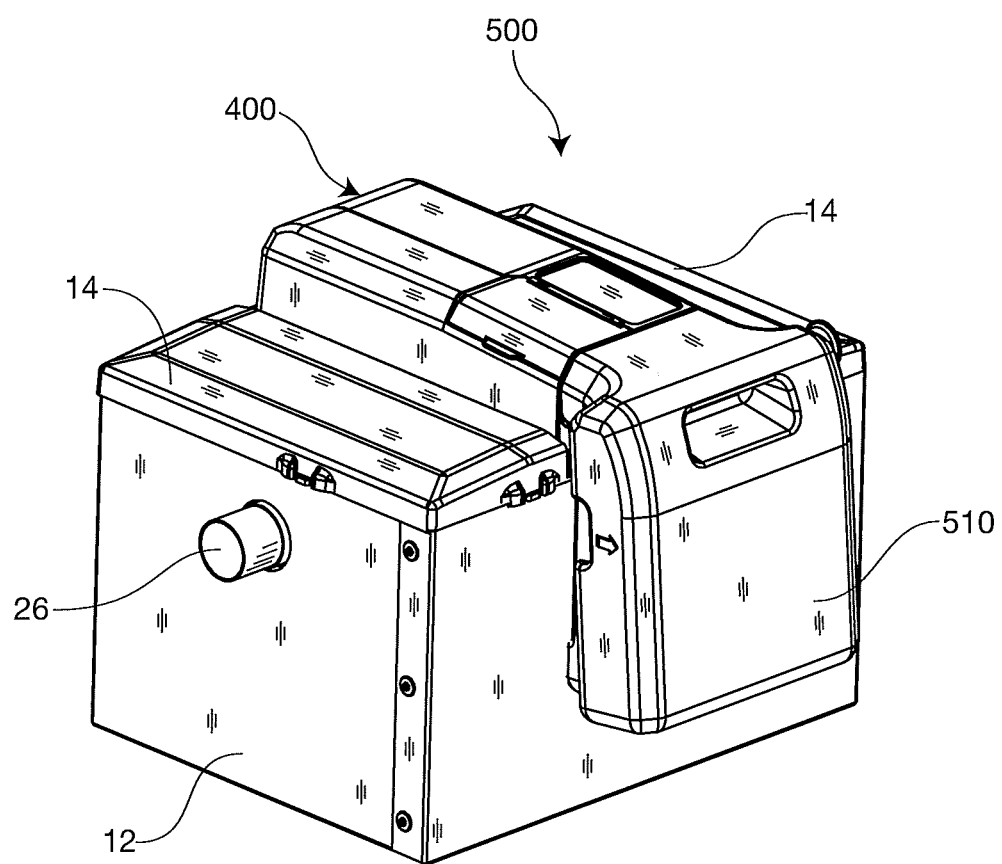
FIG. 26 is a perspective view of an embodiment of the invention.
Figure 27A:
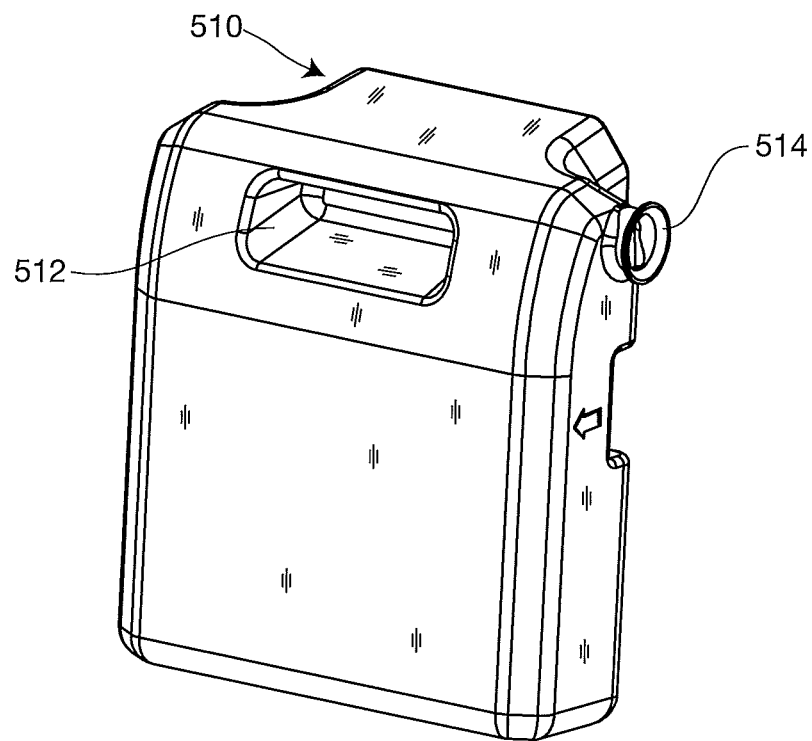
FIG. 27A is a front perspective view of one example of a grease storage tank according to FIG. 26.
Figure 27B:
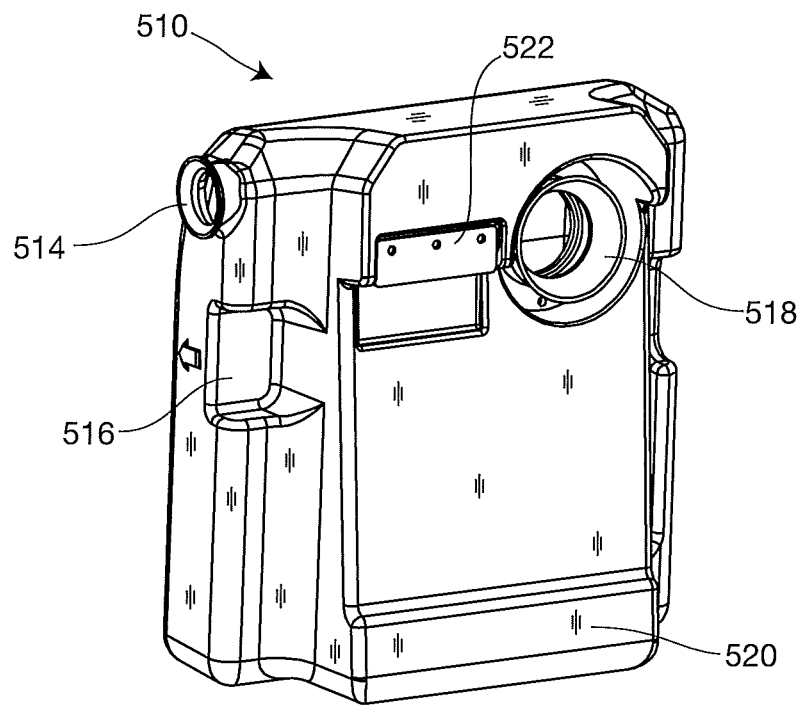
FIG. 27B is a back perspective view of one example of a grease storage tank according to FIG. 26.

In another embodiment, an assembly 500 (shown in FIG. 26) may include a container 12, a compact unit 400, and an oil/grease storage tank 510. FIGS. 27A-B show front and back views of the storage tank 510 of assembly 500. The storage tank 510 may include a lifting handle 512 for lifting and easy carry of the tank 510 for emptying the tank. Tank 510 may include an empty spout 514. Empty spout 514 may include a cover (not shown) for when the storage tank is nestled with the container 12. The tank may include a second interface 522 designed to mate with first interface 415. The interface 522 may be, by way of example, a plate configured to latch onto, for example slip over, the interface 415 to secure the tank 510, container 12 and compact unit 400 when in use.

An alignment piece 518 may be included on tank 510 to align the tank 510 with the compact unit 400. The alignment piece 518 may accept the outlet 425 so that oil/grease may leave the trough 422 and travel through the outlet 425 and into the tank 510. There may be a seal to seal the connection between the outlet 425 and the alignment piece 518.

The tank 510 may include one or more notches 516. A notch 516 may, by way of example, be located on one side or both sides of the tank 510. The notch 516 allow the user to grip the tank for removal from the assembly 500, for example, to empty the tank.

Tank 510 may include rest 520. Rest 520 may be, for example, a step, slot, depression, and/or a projection that facilitates the nestling of the tank 510 with the container 12. In some examples, rest 520 may be a step that rests on a ledge or indention of the container 12 when the container 12 and tank 510 are mated for oil/grease collection and storage. The tank 510 may also rest on the ground and be self-supported when mated to container 12. In other embodiments, tank 510 may be supported by the container 12 when in use, for example, partially or in full by the rest 520.

Certain modifications and improvements will occur to those skilled in the art upon reading the foregoing description. It should be understood that all such modifications and improvements have been omitted for the sake of conciseness and readability but are properly within the scope of the following claims.

We claim:

1. A method of assembly of a sealed modular oil/grease removal assembly comprising:
    installing a sealed container for receiving and holding effluent water containing oil/grease to be removed from the effluent water;
    providing a main cover;
    sealing the sealed modular oil/grease removal assembly including:
        a sealed skimming wheel enclosure enclosing a skimming wheel that is mounted to the sealed container within the sealed skimming wheel enclosure,
        an enclosure top adapted to enclose any portions of the skimming wheel that extend above the main cover, wherein the enclosure top and the sealed skimming wheel enclosure form the sealed modular oil/grease removal assembly cooperatively with the sealed container to prevent egress of vapors from the sealed container;
        the skimming wheel within the sealed modular oil/grease removal assembly and in at least a partially immersed position within a body of effluent water and in contact with the oil/grease;
    engaging a trough in relation to opposite sides of the skimming wheel;
    mounting a scraper blade on the trough so that the scraper blade extends from the trough into sliding engagement with a side of the skimming wheel, the skimming wheel, the scraper blade and the trough cooperatively disposed and structured to direct the oil/grease from the skimming wheel, along the scraper blade, and along the trough, for collection in a storage tank through a grease outlet;
    mounting a drive on the main cover in driving engagement to provide rotation of the skimming wheel when the drive is engaged; and
    incorporating a sealed user control assembly including:
        a sealed user control enclosure housing an electronics and allowing access to a user controls; and
        a user control top, the sealed user control enclosure and the user control top collectively forming the sealed user control assembly.

2. The method of assembly of a sealed modular oil/grease removal assembly of claim 1 including interfacing the sealed modular oil/grease removal assembly and the sealed user control assembly in one container unit.

3. The method of assembly of a sealed modular oil/grease removal assembly as claimed in claim 2, wherein the one container unit is rotatable and accessible to an outlet on opposite sides of the sealed container.

4. The method of assembly of a sealed modular oil/grease removal assembly as claimed in claim 3, including locating the outlet above the enclosure top of the sealed container, such that the outlet is rotatable with the one container unit.

5. The method of assembly of a sealed modular oil/grease removal assembly as claimed in claim 4, wherein the sealed user control enclosure may be a separate enclosure from the sealed skimming wheel enclosure.

6. The method of assembly of a sealed modular oil/grease removal assembly as claimed in claim 1 including sealing a hose connection.

7. The method of assembly of a sealed modular oil/grease removal assembly as claimed in claim 1 including extending a trough extension between the trough and the grease outlet.

8. The method of assembly of a sealed modular oil/grease removal assembly as claimed in claim 1 including adding a main sectional cover that supports an electrical resistance heater that extends downwardly into the sealed container so as to have an operable portion of the electrical resistance heater at least partially immersed within the body of effluent water to cause the oil/grease to be in liquid form.

9. The method of assembly of a sealed modular oil/grease removal assembly as claimed in claim 8 including supporting an electrical controls with the main sectional cover for selectively operating the drive and the electrical resistance heater.

10. The method of assembly of a sealed modular oil/grease removal assembly as claimed in claim 9 including encasing a rotating disk, the trough, the scraper blade and the electrical controls within distinct sealed assemblies.

11. The method of assembly of a sealed modular oil/grease removal assembly as claimed in claim 10 wherein the electrical controls includes connecting a timer to the drive to control a start and stop operation of the drive to permit a selected duty cycle to remove grease at times when the grease is likely to be present.

12. The method of assembly of a sealed modular oil/grease removal assembly as claimed in claim 11 wherein the main sectional cover has two pair of opposite sides with one of the pair of opposite sides adapted to engage the sealed container for support of the main sectional cover by the sealed container and the other of the pair of opposite sides adapted to engage additional sectional covers.

13. The method of assembly of a sealed modular oil/grease removal assembly as claimed in claim 12 including engaging the two pair of opposite sides with the additional sectional covers and have a flange extending downwardly and laterally so as to be positioned under a portion of the additional sectional covers, with a further extension downwardly to provide rigidity.

14. The method of assembly of a sealed modular oil/grease removal assembly as claimed in claim 1 wherein the sealed container includes inwardly turning an upper flange, a gasket on the inwardly turned upper flange, and clasps to hold the main cover to the inwardly turned upper flange and seal a main sectional cover to the inwardly turned upper flange by compression of the gasket.

15. The method of assembly of a sealed modular oil/grease removal assembly as claimed in claim 1 including dividing a disk into two disk sheets separately formed and subsequently joined together, each of the two disk sheets include a flat oleophilic surface and a surface having a plurality of spaced peripheral lugs.

16. The method of assembly of a sealed modular oil/grease removal assembly as claimed in claim 1 further comprising mounting a sensor module to the main cover, the sensor module including a probe extending downwardly within the body of effluent water to a depth normally below the oil/grease, a sensor in the probe providing electrical indications as to whether the sensor is in proximity to the oil/grease or the effluent water, and an alarm on the sensor module to provide a human-recognizable indication if the sensor senses that the probe is in proximity to the oil/grease rather than a normally-present water.

17. The method of assembly of a sealed modular oil/grease removal assembly of claim 1 including forming a magnetic sealing system between the sealed container and the main cover.

18. The method of assembly of a sealed modular oil/grease removal assembly of claim 17 including forming the magnetic sealing system within at least one of the sealed skimming wheel enclosure and the sealed user control enclosure.

* * * * *